United States Patent
Yue et al.

(10) Patent No.: US 12,086,541 B2
(45) Date of Patent: Sep. 10, 2024

(54) NATURAL QUERY COMPLETION FOR A REAL-TIME MORPHING INTERFACE

(71) Applicant: Brain Technologies, Inc., San Mateo, CA (US)

(72) Inventors: Sheng Yue, San Mateo, CA (US); Soham Pranav Shah, Redwood City, CA (US); Mathew Hock-Zian Teoh, San Mateo, CA (US)

(73) Assignee: Brain Technologies, Inc., San Mateo, CA (US)

( * ) Notice: Subject to any disclaimer, the term of this patent is extended or adjusted under 35 U.S.C. 154(b) by 442 days.

(21) Appl. No.: 17/187,093

(22) Filed: Feb. 26, 2021

(65) Prior Publication Data

US 2021/0192134 A1  Jun. 24, 2021

Related U.S. Application Data

(63) Continuation-in-part of application No. 17/013,324, filed on Sep. 4, 2020, now Pat. No. 11,531,451.
(Continued)

(51) Int. Cl.
*G06F 40/274* (2020.01)
*G06F 3/04817* (2022.01)
(Continued)

(52) U.S. Cl.
CPC ........ *G06F 40/274* (2020.01); *G06F 3/04817* (2013.01); *G06F 16/3326* (2019.01);
(Continued)

(58) Field of Classification Search
CPC ............... G06F 40/274; G06F 3/04817; G06F 16/3326; G06F 40/279; G06F 40/30;
(Continued)

(56) References Cited

U.S. PATENT DOCUMENTS

| 9,633,317 | B2 | 4/2017 | Gabel et al. |
| 10,838,779 | B1 | 11/2020 | Yue et al. |

(Continued)

FOREIGN PATENT DOCUMENTS

| WO | WO 2014/197635 A2 | 12/2014 |
| WO | WO 2019/107145 A1 | 6/2019 |

OTHER PUBLICATIONS

United States Office Action, U.S. Appl. No. 17/013,324, filed Jan. 18, 2022, 18 pages.
(Continued)

*Primary Examiner* — Daniel C Washburn
*Assistant Examiner* — Paul J. Mueller
(74) *Attorney, Agent, or Firm* — Fenwick & West LLP

(57) ABSTRACT

A morphing interface system updates, that is, morphs a display on a client device as a user provides portions of input and additionally provides suggested selections for a user based on the received user input. The system receives a first portion of user input and generates intent suggestions for the user based on the user input. The intent suggestions, which represent predicted likely intents of the user, are provided to the user for selection. The user may select an intent suggestion or may provide additional user input. Based on the user response, the system determines whether an intent is selected or if additional information is needed. When an intent is selected, the interface morphs into an interface to provide predicted entity suggestions for the user to select entity values as inputs to execution of the intent.

17 Claims, 12 Drawing Sheets

Related U.S. Application Data

(60) Provisional application No. 63/038,604, filed on Jun. 12, 2020, provisional application No. 62/895,944, filed on Sep. 4, 2019.

(51) Int. Cl.
*G06F 16/332* (2019.01)
*G06F 40/279* (2020.01)
*G06F 40/30* (2020.01)
*G06F 40/40* (2020.01)
*G06N 3/02* (2006.01)

(52) U.S. Cl.
CPC ............ *G06F 40/279* (2020.01); *G06F 40/30* (2020.01); *G06F 40/40* (2020.01); *G06N 3/02* (2013.01)

(58) Field of Classification Search
CPC ...... G06F 40/40; G06F 3/167; G06F 3/04895; G06N 3/02; G06N 3/084; G06N 5/01; G06N 20/00; G06N 20/10; G06N 20/20; G06Q 30/0625; G06Q 30/0633; G06Q 30/0641; G10L 15/1822
See application file for complete search history.

(56) References Cited

U.S. PATENT DOCUMENTS

| | | |
|---|---|---|
| 2008/0104037 A1 | 5/2008 | Bierner |
| 2011/0112827 A1 | 5/2011 | Kennewick et al. |
| 2012/0016678 A1* | 1/2012 | Gruber ................ H04M 1/6091 704/E21.001 |
| 2012/0233207 A1 | 9/2012 | Mohajer et al. |
| 2013/0110519 A1 | 5/2013 | Cheyer et al. |
| 2013/0117253 A1 | 5/2013 | Wang et al. |
| 2013/0117297 A1 | 5/2013 | Liu et al. |
| 2013/0226953 A1 | 8/2013 | Markovich et al. |
| 2013/0311997 A1 | 11/2013 | Gruber et al. |
| 2014/0272821 A1 | 9/2014 | Pitschel et al. |
| 2015/0066968 A1 | 3/2015 | Bastide et al. |
| 2015/0347503 A1 | 12/2015 | Kumaran et al. |
| 2016/0217124 A1 | 7/2016 | Sarikaya et al. |
| 2016/0259775 A1 | 9/2016 | Gelfenbevn et al. |
| 2017/0132019 A1 | 5/2017 | Karashchuk et al. |
| 2017/0199943 A1 | 7/2017 | Steelberg et al. |
| 2018/0052824 A1 | 2/2018 | Ferrydiansyah et al. |
| 2018/0068657 A1 | 3/2018 | Khan et al. |
| 2018/0122009 A1 | 5/2018 | Jaycobs et al. |
| 2018/0137855 A1 | 5/2018 | Lee et al. |
| 2018/0150280 A1 | 5/2018 | Rhee et al. |
| 2018/0197540 A1 | 7/2018 | Lee et al. |
| 2018/0233141 A1 | 8/2018 | Solomon et al. |
| 2018/0268345 A1 | 9/2018 | Tolica et al. |
| 2019/0018885 A1* | 1/2019 | Wakankar .......... G06F 16/90324 |
| 2019/0237061 A1 | 8/2019 | Rusak et al. |
| 2019/0244419 A1 | 8/2019 | Bell et al. |
| 2019/0258456 A1 | 8/2019 | Byun et al. |
| 2019/0341040 A1 | 11/2019 | Kirazci et al. |
| 2020/0143798 A1 | 5/2020 | Kim et al. |
| 2020/0159824 A1 | 5/2020 | Boxwell et al. |
| 2020/0160863 A1 | 5/2020 | Lee et al. |
| 2020/0312298 A1* | 10/2020 | Bui .......................... G06F 3/167 |
| 2020/0326832 A1 | 10/2020 | Lee et al. |
| 2020/0380077 A1 | 12/2020 | Ge et al. |
| 2020/0387550 A1 | 12/2020 | Cappetta et al. |
| 2021/0064203 A1 | 3/2021 | Yue |

OTHER PUBLICATIONS

Hirschberg, J. et al. "Advances in natural language processing," Science, vol. 349, Issue 6245, Jul. 17, 2015, pp. 261-266.

McGee, M., "Google Instant Search: The Complete User's Guide," Sep. 8, 2010, 12 pages, [Online] [Retrieved on Apr. 25, 2022] Retrieved from the Internet <URL: https://searchengineland.com/google-instant-complete-users-guide-50136>.

PCT International Search Report and Written Opinion, PCT Application No. PCT/US2022/017628, May 16, 2022, 18 pages.

United States Office Action, U.S. Appl. No. 17/013,324, filed Apr. 29, 2022, 21 pages.

Yuan, F. et al. "Future data helps training: Modeling future contexts for session-based recommendation," arXiv:1906.04473v4, Jan. 25, 2020, pp. 303-313.

Berner, U. et al., "A Scalable Avatar for Conversational User Interfaces," ERCIM Workshop on 1-20 User Interfaces for All, Mar. 14, 2003, pp. 1-11.

Microsoft News, "Microsoft Patents Dynamic User Interface That Changes According To A Type Of Input," Dec. 5, 2014, pp. 1-3, [Online] [Retrieved on Oct. 2, 2020] Retrieved from the Internet <URL: https://mspoweruser.com/microsofl-patents-dynamic-user-interface-that-changes-according-to-atype-of-in puU>.

PCT International Search Report and Written Opinion, PCT Application No. PCT/US2020/049544, Dec. 8, 2020, pp. 1-14.

Extended European Search Report and Written Opinion, European Patent Application No. 20860852.1, Sep. 19, 2023, 10 pages.

\* cited by examiner

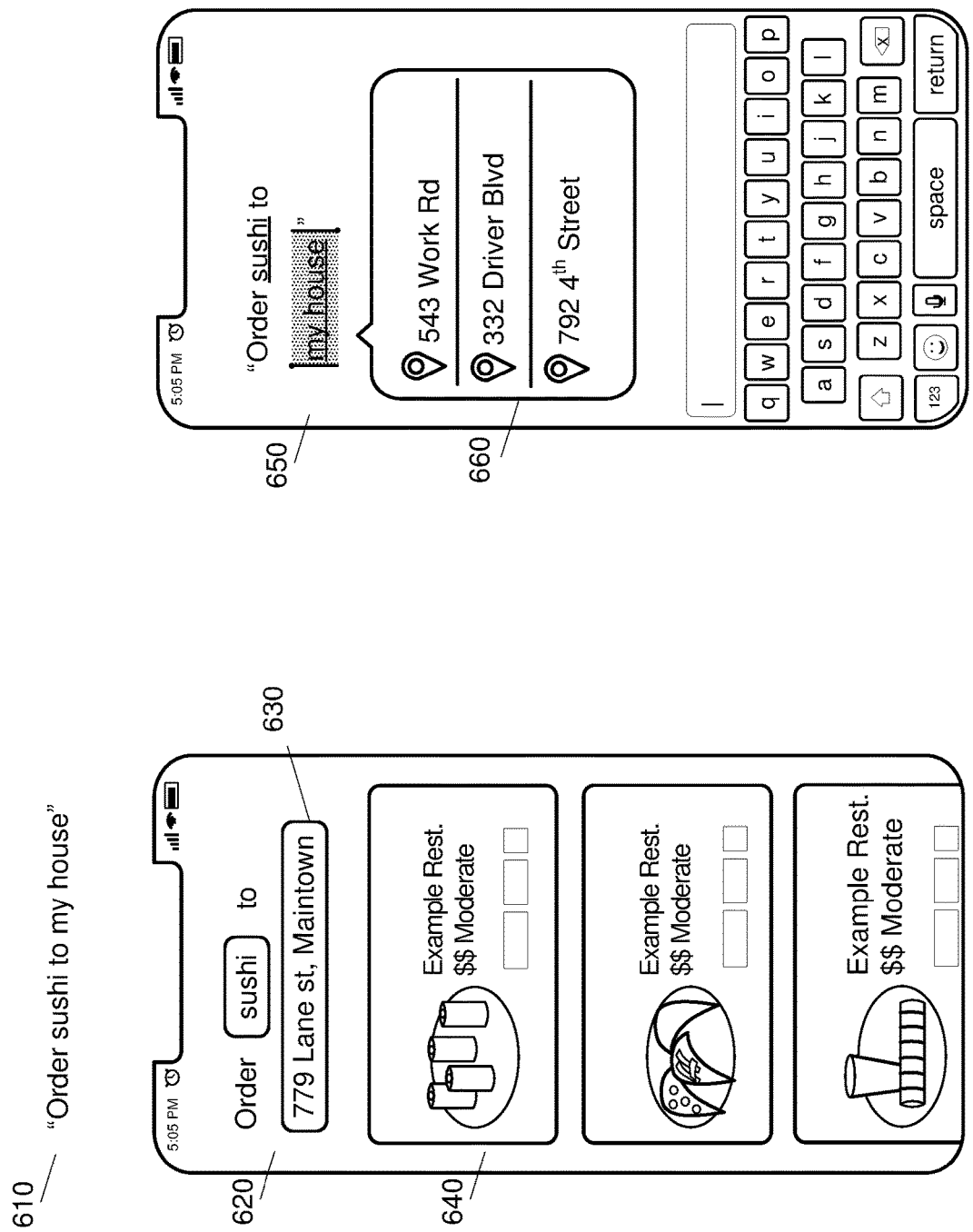

NATURAL QUERY COMPLETION FOR A REAL-TIME MORPHING INTERFACE

CROSS-REFERENCE TO RELATED APPLICATIONS

This application is a continuation-in-part of U.S. patent application Ser. No. 17/013,324, filed Sep. 4, 2020 which claims the benefit of U.S. Provisional Patent Application 62/895,944, filed Sep. 4, 2019 and U.S. Provisional Patent Application 63/038,604, filed Jun. 12, 2020, the contents of which are incorporated herein by reference in their entirety. The present application also claims the benefit of U.S. Provisional Patent Application 63/038,604 filed Jun. 12, 2020, which is also incorporated herein by reference in its entirety.

BACKGROUND

Computer assistants such as smart speakers and artificial intelligence programs are growing in popularity and in use in various user-facing systems. The computerized systems can often be implemented such that an entire process is automated without the human user of the system having any insight into the process. For example, a computer can execute a set of tasks without the need to display content to a screen for the user. However, many users prefer to receive feedback about a computerized process, and it may be useful or necessary for a user to understand the state of a set of tasks if the user is needed to provide feedback or input at a particular step in the process.

Additionally, users want assistant systems to respond as quickly as possible. However, if a system responds to a user before it has received an entire set of instructions from the user, the system may perform an inapplicable task for the user, or may not have received enough information to display the content to the screen for the user to view. Furthermore, input provided by a user may be indicative of multiple different user intents, or requests may be expressed differently by different users, for example because of varying speech patterns, colloquialisms, vocabularies and the like. Thus, it can be difficult for a system to determine an intent of a user and to reliably and accurately collect all required input values from the user for executing the user's intent without a user manually navigating through many interfaces and manually filling out fields in various forms to provide input to the computer system.

BRIEF DESCRIPTION OF THE DRAWINGS

FIG. 6A illustrates an example user interface for receiving user input and presenting options for the user based on a predicted user intent.

FIG. 6B illustrates a next example user interface for receiving user input and presenting options for the user based on a predicted user intent.

Figure 1:
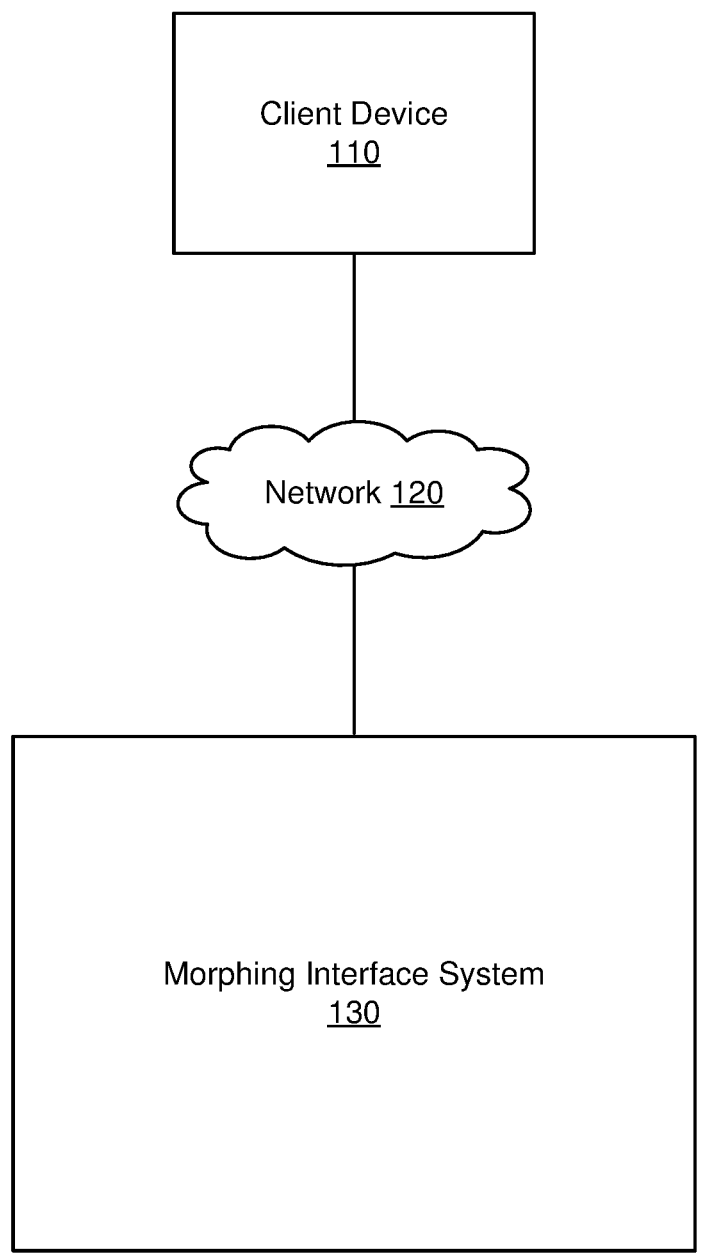
FIG. 1 is a high level block diagram of a system environment for a morphing interface system, in accordance with an example embodiment.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict embodiments for purposes of illustration only. One skilled in the art will readily recognize from the following description that alternative embodiments of the structures and methods illustrated herein may be employed without departing from the principles of the various embodiments described herein.

The features and advantages described in this brief description and the following detailed description are not limiting and not all-inclusive. Many additional features and advantages will be apparent to one of ordinary skill in the art in view of the drawings, specification, and claims hereof.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar of like functionality. The figures depict embodiments of the disclosed system (or method) for purposed of illustration only. One skilled in the art will readily recognize from the following description that alternative embodiments of the structures and methods illustrated herein may be employed without departing from the principles described herein.

Configuration Overview

Disclosed are systems (as well as methods and computer program code stored on non-transitory computer readable media) configured to predict and present intent suggestions and entity suggestions for users based on partial user inputs. In one embodiment, the computer system may include one ore more computer processors for executing computer program instructions and a non-transitory computer-readable storage medium comprising stored instructions executable by at least one processor. In the example embodiment, the instructions may include instructions that when executed cause the processor to receive a first partial user input from the client device, generate a first set of natural language processing (NLP) signals based on the first partial user input, and transmit, to the client device, one or more intent suggestions from the set of intent suggestions. The instructions may further include instructions to receive, form the client device, a user selection of an intent from the set of intent suggestions, to identify a set of entities associated with the selected intent, wherein an entity is a parameter for which a value is needed as input to execute the selected intent. Using the information about the identified entities, the instructions include instructions to generate a set of entity value suggestions that are not identified by information that has been received from the client device for entities of the set of entities and to transmit, to the client device, information for rendering on a software user interface of the client device, the interface for obtaining one or more of the entity values from the set of entities that are not identified by information that has been received from the client device, the information for rendering the interface including the set of entity value suggestions. The instructions additionally include instructions to receive, from the client device, and indication of one or more entity values and, subsequent to receiving one or more entity values associated with the selected intent, to execute the selected intent, wherein the execution of the selected intent comprises providing the received entity values associated with the intent as input to the execution of the intent.

Example System Configuration

FIG. 1 is a high level block diagram of a system environment for a morphing interface system, in accordance with an example embodiment. FIG. 1 includes a morphing interface system 130, a network 120, and a client device 110. For clarity, only one client device and one morphing interface system 130 are shown in FIG. 1. Alternate embodiments of the system environment can have any number of client devices 110 as well as multiple morphing interface systems 130. The functions performed by the various entities of FIG. 1 may vary in different embodiments.

The morphing interface system 130 generates (or renders or enables or provides for rendering) a user interface for display to a user in response to user input (e.g., a typed or spoken text string). In some embodiments, the system may also receive visual input, such as from a camera roll of a client device 110, to effectuate a search process on an online search engine or online marketplace. The morphing interface system 130 determines a user intent and accordingly produces and populates a user interface for executing the intent. The user intent corresponds to a machine (e.g., computer or computing system) prediction of what may be intended by a user based upon received user input. Accordingly, the user intent may be a computer executable function or request that corresponds to, and/or is described by, the received user input. The executable function may be instantiated by generating and/or populating (e.g., in a rendering) one or more user interfaces for the function that may be executed and that corresponds to what may be the predicted intent.

As the morphing interface system 130 receives additional user input (e.g., more characters or words are added to the typed or spoken input string), the morphing interface system 130 reevaluates whether the determined user intent is still the most relevant match to the user input. If another user intent better suits the updated input, the morphing interface system 130 generates and populates a new user interface (e.g., for rendering for display at a client device 110) that applies to the new intent. That is, the user interface "morphs" from one interface to another interface as the morphing interface system 130 receives more input information about what intent best aligns with the user's input. Hence, the user interface is transformed on a screen, e.g., of the client device, as additional information is added and user input (or partial user input) is analyzed for the added information. The morphing transformation of the user interface may thus cause a change in the user interface as each new word is spoken or as each new character is typed and provided as input in various embodiments.

In some embodiments, the morphing interface system 130 predicts likely user intents based on partial user input and may provide suggested intents for display to the user at the client device 110, e.g., as prompts for user selection. An entity is an input parameter to an intent. When an intent is determined for the user, the morphing interface system 130 may determine a set of entities associated with execution of the intent (i.e., parameters for which the intent requires input values for execution). Based on the user input, the morphing interface system 130 may present the user with an interface for inputting entity values associated with the intent, and may further provide suggested entity values for the user based on past user interactions with the morphing interface system 130.

A user may enter user input such as typed text or spoken voice input via a client device 110. Client devices 110 can be any personal or mobile computing devices such as smartphones, tablets, notebook computers, laptops, desktop computers, and smartwatches as well as any home entertainment device such as televisions, video game consoles, television boxes, and receivers. The client device 110 can present information received from the morphing interface system 130 to a user, for example, in the form of user interfaces. In some embodiments, the morphing interface system 130 may be stored and executed from the same machine as the client device 110. In some embodiments, a client device may include a client-side rendering engine and/or may be configured to support functionalities of the morphing interface system 130 at the client device 110. In such cases, the client device 110 may store instructions for displaying possible user interfaces corresponding to possible intents, and the client device 110 may further support natural language processing systems to determine the user's intent and any entities mentioned by the user. For example, as a user provides input, a client device configured to perform the functions of the morphing interface system 130 locally may determine a user intent and render a user interface corresponding to the intent rather than sending the collected input to a remote morphing interface system 130 over the network 120.

The client device 110 can communicate with the morphing interface system 130 via the network 120, which may comprise any combination of local area and wide area networks employing wired or wireless communication links. In some embodiments, all or some of the communication over the network 120 may be encrypted.

Figure 2:
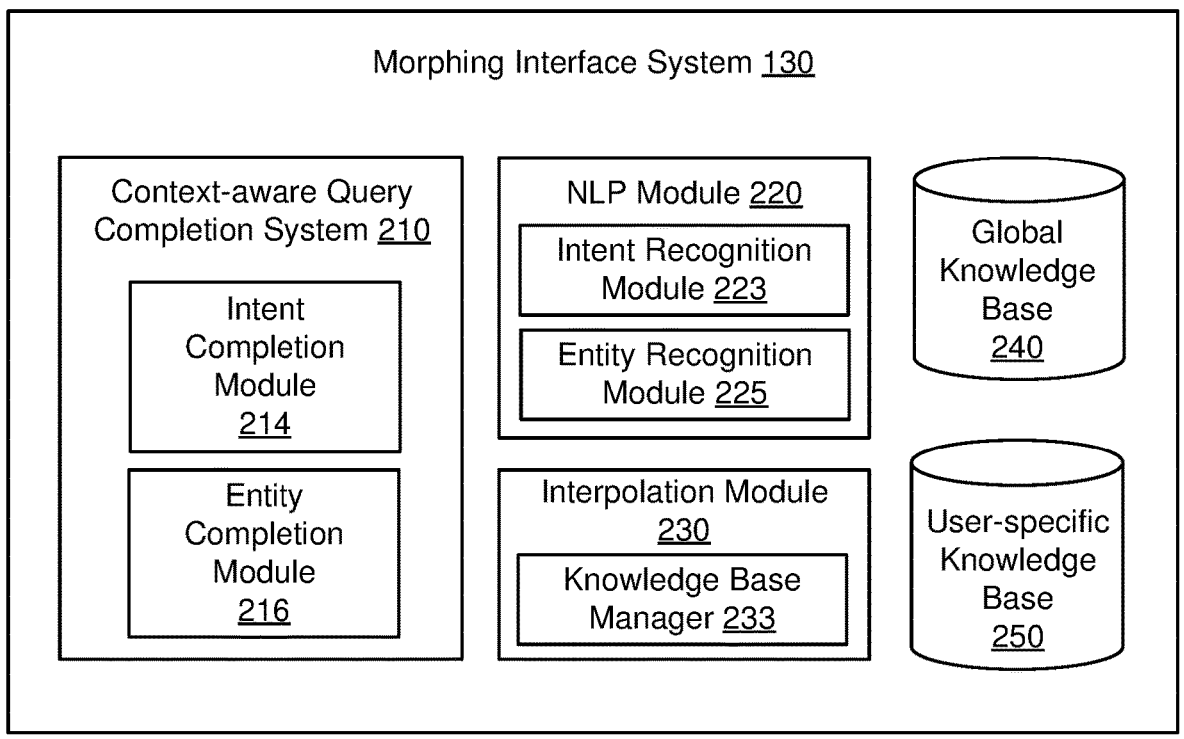
FIG. 2 is a high-level block diagram of a system architecture for the morphing interface system, in accordance with an example embodiment.

FIG. 2 is a high-level block diagram of a system architecture for the morphing interface system 130, in accordance with an example embodiment. The morphing interface system 130 includes various modules and data stores associated with determining and executing user intents and with providing relevant interfaces for presentation to a user at a client device 110. The modules may be software modules having specific functional program code described herein that may be stored in a memory and/or storage device and the program code may be executable by a processing system (e.g., processor or controller). The modules also may be configured in hardware (e.g., field programmable gate arrays (FPGA) or application specific integrated circuits (ASIC)) with instructions sets that carry out the described functionality.

The morphing interface system 130 comprises a context-aware query completion system 210, a natural language processing (NLP) module 220, an interpolation module 230, a global knowledge base 240, and a user-specific knowledge base 250. Computer components such as web servers, network interfaces, security functions, load balancers, failover servers, management and network operations consoles, and the like are not shown so as to not obscure the details of the system architecture. Additionally the morphing interface system 130 may contain more, fewer, or different components than those shown in FIG. 2 and the functionality of the components as described herein may be distributed differently from the description herein.

The natural language processing (NLP) module 220 parses partial or complete user queries that are received by the morphing interface system 130. The NLP module 220 may analyze the user input each time an additional token, character, word, or the like is received from the client device 110 to add to the user query. In some embodiments, the NLP module 220 may be configured to use natural language processing techniques including one or more of: tokenization, part-of-speech tagging, stemming, lemmatization, stop-word identification, dependency parsing, entity extraction, chunking, semantic role labeling, and coreference resolution. In some embodiments, the NLP module includes an intent recognition module 223 and/or an entity recognition module 225. The intent recognition module 223 may be configured to determine one or more intents of a user based on the user input and the entity recognition module 225 may be configured to detect and collect entity values mentioned by the user that are associated with entities that are required for executing a user intent. The NLP module 220 may produce one or more outputs including metadata about the user input in the form of natural language processing signals. In some embodiments, the NLP module 220 may access the global knowledge base 240 and/or the user-specific knowledge base 250, or an external data source to obtain additional input data to analyze user input queries received from the client device 110.

In some embodiments, the NLP module 220 may include the intent recognition module 223, the entity recognition module 225, and a mapping of intents to corresponding entities (e.g., the NLP module 220 may have access to stored data mapping the intent "book a flight" to corresponding entities associated with the intent such as departure and destination locations, dates, cabin types, etc.). The intent recognition module 223 works in conjunction with the intent completion module 214 to determine a domain (i.e., a category or field of intents) and an intent associated with user input, and to suggest potential entries related to predicted domains or intents of the user. The NLP module 220 may access external data sources, e.g., via application programming interfaces (APIs) or other third-party sources to fetch entity values corresponding to a domain.

The context-aware query completion system 210 manages the completion of user intents and the determination of entity values that are needed to execute the user intents. An intent may be "completed" when the context-aware query completion system 210 has received enough input information to predict, based on the user input, one or more intents from the possible set of intents that has more than a threshold likelihood of being the intent that is intended by the user. In other words, intent completion may be understood as the morphing interface system 130 having enough user input to identify a specific intent (or multiple specific intents) within a domain of multiple possible intents. As an example of predicting more than one intents from the possible set of intents, a user input of, "Get me water bottles" may be satisfied by purchasing water bottles from a grocery store or through an online retailer. That is, in some cases, the context-aware query completion system 210 may be configured to recognize ambiguity in an otherwise completed intent, and can provide the user with suggestions for further contextualizing the intent such as, "Get me water bottles through an online retailer" or, "Get me water bottles from <local grocery store>".

In one example embodiment, the context-aware query completion system 210 comprises an intent completion module 214 and an entity completion module 216. In various embodiments, the intent completion module 214 and entity completion module 216 may function separately, or may be configured as a single module. In various embodiments, modules and functionalities of the context-aware query completion system 210 and the NLP module 220 may be distributed differently from the description herein. The context-aware query completion system 210 may receive partial user inputs as well as natural language processing signals and metadata associated with analysis of the partial input by the natural language processing module 220. Additionally, the context-aware query completion system 210 may receive data identifying recognized intents or entities associated with the user input from the intent recognition module 223 and/or the entity recognition module 225. Depending on whether the morphing interface system 130 is in the process of completing a user intent or predicting entity values needed to execute a user intent, the intent completion module 214 or the entity completion module 216 may be used to determine a response to the user input.

For example, as the user begins to type a phrase, e.g., "Book a", as an input, the intent recognition module 223 may use machine learning models trained to identify intents based on input to predict that the user intends "Flights" and "Movie tickets" as possible domains and "booking" as an intent that may be available within those domains. Thereafter, the intent completion module 214 may suggest completions for these intents based on the beginning phrase, e.g., "Book a flight", "Book a movie ticket". Once the user chooses one of the suggested intents, for example, "Book a flight", the entity completion module 216 determines which entities associated with the selected intent have already been mentioned by the user, and which entities to suggest next.

In the above example, the user has not yet input any information about entities related to the "Flight Booking" intent, so the entity completion system may generate the entity "from <START_LOCATION>" as a first suggestion for display to the user as a prompt for information about the required entity value. The angle bracket notation herein indicates a placeholder value for an intent or entity for which the morphing interface system 130 will select options prior to presentation to the user. In order to populate the placeholder value <START_LOCATION> with relevant airports close to the user (e.g., based on location tracking of a device the user is using), the NLP module 220 may access corresponding external APIs, as well as source from user-specific knowledge, collected from past queries and stored preferences of the user. In some embodiments, the morphing interface system 130 may include a knowledge base manager 233 that can work with the interpolation module 230 to populate the determined intent with options for entity values that are relevant to the user. That is, in some example embodiments, one or both of a knowledge base manager 233 and an interpolation module 230 may fetch values for entities from the global 240 and user-specific 250 knowledge bases, and populate (interpolate) the final suggestion sent to the user. In some embodiments, the functionality of the knowledge base manager 233 may be supported directly by the interpolation module 230. In some embodiments, the functionality of the knowledge base manager 233 may be configured to work separately from other aspects of the interpolation module 230.

For example, the context-aware query completion system 210 may build "Buy me <product> from <retailer>" as an intent completion. The knowledge base manager 233 may be configured to fetch the most likely entity values for the placeholder values <product> and <retailer>. The interpolation module 230 may be configured to insert the values into their corresponding slots, in this example, <product> and <retailer>, and to account for correct syntax, semantics and grammar of the final query completion.

In another example embodiment, the intent completion and entity completion systems work together to create intent completions that contain entities required to disambiguate and execute the intent. For example, as a user inputs "Buy me", the intent recognition system may interpret "online shopping" and "food ordering" as likely domains, since both domains involve purchases. For context, the "entity-free" intent completions for these domains would be "Buy me food" and "Buy me something online". However, in an embodiment that includes presentation of predicted entities in the intent completions, the intent completion module 214 may generate the suggested intents "Buy me<specific dish name>" and "Buy me<specific product>". As the domains are determined by the intent recognitions module 223, the knowledge base manager 233 may communicate via APIs corresponding to the domains, such as online retail APIs to obtain information about trending products, and such as food ordering APIs to obtain information about dishes from nearby restaurants. The knowledge base manager 233 may also access the user-specific knowledge base 250 to get values of entities from the user's past queries and specified preferences, such as the user's recent product searches, recently purchased dishes, related products, and dishes that match their interests. The knowledge base manager 233 may not access data from external APIs directly in all embodiments—when external APIs and data are used to obtain information that has not been obtained before by the morphing interface system 130, unique results may be saved into the global knowledge base 240 for future use. This information may be stored in the global knowledge base 240 in a graph-based structure that maps domains to intents, domains to concepts, and domains to specific entities. In some embodiments, caching, distributed storage and other optimizations are also employed by the morphing interface system 130 to enable low latency data access.

When a user provides input to a client device 110, the morphing interface system 130 uses trained machine learning models to analyze the received input and natural language processing signals associated with the received input to determine a domain of the input and a user intent related to the determined domain. A domain is a broad category or field to which user input may be related, that is, a possible intent category. Example domains may include: travel, shopping, search, food, fashion, and entertainment. In some embodiments, a set of domains may be predefined and stored for reference by the content-aware query completion system 210. In some embodiments, the context-aware query completion system 210 may store a set of learned domains as generated through machine learning techniques. That is, as the morphing interface system 130 is used, the context-aware query completion system 210 may use machine learning models that are trained to identify categorizations of intents to determine additional possible domains that can be stored for future reference.

In one embodiment, the context-aware query completion system 210 may store a set of intents that it has been configured to be able to execute or to cause to be executed (e.g., the context-aware query completion system 210 may have access to APIs that allow it to book a flight and consequently may store the intent of "flight booking"). An intent is associated with a set of entities which are input parameters of the intent. That is, to execute an intent, the morphing interface system 130, may need a value for each of the entities of the intent. In some embodiments, the context-aware query completion system 210 will store names or identifications of entities associated with each intent, and receive values for the entities from the interpolation module 230. In other embodiments, the context-aware query completion system 210 may itself store sets of entities and their possible values that are associated with each intent. For clarity, "entity" and "entity name" are terms used herein to refer to the concept of the entity (e.g. ProductName) and the term "entity value" refers to valid examples of the entity (e.g. highdefTV or bedside lamp). In some embodiments, the context-aware query completion system 210 may also store one or more user interfaces in association with each intent. The user interfaces associated with an intent may be for displaying to a user to prompt collection of entity values, and may also include interfaces to display to the user during execution of the intent.

The intent completion module 214 generates suggested intents to recommend to a user. By providing recommended intents to a user based on partial user inputs, the intent completion module 214 can shorten the time it takes for an accurate user intent to be determined, which is beneficial to providing quick and useful responses to a user. The intent completion performed by the intent completion module 214 further assists the user by raising awareness of the domains that the user may access and the intents that are available for execution that are most relevant to the user's partial input. In one embodiment, the intent completion module 214 may include a recognition subsystem and a prediction subsystem. The intent completion module 214 may use the recognition subsystem to assess what information the user has already provided in input and whether a domain or intent have already been determined. If an intent is not already determined, the prediction subsystem generates one or more predicted intents to provide as suggestions to the user based on the user input. In other embodiments, this recognition subsystem may be a part of the natural language processing module 220.

To generate relevant and accurate recommended intents that are personalized to the user, the intent completion module 214 may be configured to use a rule-based approach, a model-based approach, or a combination of the two types of approaches. In various embodiments, the intent completion module 214 may accept input including typed tokens or characters from the user input string, past queries of the user, a probability distribution of past user queries, the context of the client device 110 (e.g., location, time, type of device, motion), and information about the context of the user interaction with the client device 110. Information about the context of a user interaction may include detected entity values within the input string that can inform domain disambiguation. For example, the entity value "pizza" in the input string "order a pizza" may be used by the intent completion module 214 to determine that the user is selecting an intent in the domain "food" rather than a different domain since pizza is a food. Information about the context of a user interaction may also include a learned language style of the user. For example, the intent completion module 214 may include models or rulesets trained to recognize natural speech patterns of a particular user. In some embodiments, the intent completion module 214 may also accept as input information about its own previous predictions related to the user query, for example when less of the partial query was available. All of the above may apply to the entity completion module 216 as well—using context of the client device 110, using a mix of rule and model based approaches to create a personalized and customizable experience, and accepting previous predictions as input.

In one embodiment, the intent completion module 214 is configured to use a rule-based approach to predict a completion of a user intent given a user query or given a partial user query. The intent completion module 214 may receive as input a user query (e.g., a partial or complete text string), and metadata including natural processing signal data that may be generated by the natural language processing module 220 based on the user query. The intent completion module 214 accesses one or more data structures or rulesets (e.g., decision trees) that are configured to output a prediction of one or more intent completions that are most likely to be associated with the user query. Some additional examples of data structures that may be used in various embodiments for intent and entity completion to enable rapid customization and personalization are prefix trees or tries, suffix trees, ternary search trees, acyclic deterministic finite automata, directed acyclic word graphs (also referred to as directed acyclic finite state automaton), and finite state transducers. In some embodiments, the intent completion module 214 may store rulesets locally at the context-aware query completion system 210. In some embodiments, rulesets may be stored in the global knowledge base 240 or at a user specific knowledge base 250. The rulesets used by the intent completion module 214 may include user-specific rulesets, that is, rule sets that are trained or otherwise configured to predict intents based on known language and behavioral patterns of a particular user. The rulesets may also or alternatively include general knowledge or community-based rulesets, that is, rulesets that determine predicted user intents but that are configured or trained based on general population or community data (where a community is a group of users that are highly similar to the interacting user in terms of age, location, occupation, interests, etc.), rather than past interactions from a single user with the morphing interface system 130.

When a partial user query is received, the intent completion module 214 determines and accesses one or more appropriate rulesets and generates a set or ranking of predicted intents. That is, the intent completion module 214 generates a set of one or more intent suggestions for suggesting predicted intents to the user. In some embodiments, this prediction of intents may be performed by the intent recognition module 223 and provided to the intent completion module 214 to complete the intent. Depending on the ruleset, the ranking may be based on a variety of considerations. In one embodiment a ruleset may analyze past queries of the user and a frequency distribution of these queries to determine intents that are likely to be related to the user query. In one embodiment, the intent completion module 214 determines a ranking of likely intents based on a ruleset that describes a pre-determined priority ordering for ideal ways in which a user may express an intent. For example, certain intents may be associated with specific input strings, and for new users, for whom the morphing interface system 130 may have no behavioral data, the morphing interface system 130 may suggest the assigned input strings to the new user as a way to train the user to provide input in a specific manner when expressing the intent. In some embodiments, the intent completion module 214 may be trained to associate partial queries that many users use to start a request for a specific intent as being likely to predict that intent. This may include identifying clusters of similar users and prioritizing popular partial queries made by users of that community as having to do with certain user intents. In some embodiments, the intent completion module 214 may predict or rank likely intents based on past user patterns stored for the user or for similar users. For example, user profile information for the user may indicate that when booking a flight, the user may always adjust the flight schedule, and the intent completion module 214 may predict, based on the user query input that the user's intent is to book a flight, and may recommend an intent template that can be populated with a predicted time by the interpolation module 230. Additional information about intent templates is described with references to the interpolation module 230, below.

In one embodiment, the intent completion module 214 is configured to use a machine learning model-based approach to predict a user intent given a user query or given a partial user query. As with rule-based approaches, the intent completion module 214 may receive as input a user query (e.g., a partial or complete text string), and metadata including natural processing signal data that may be generated by the natural language processing module 220 based on the user query.

The neural networks and other machine learning models that generate predictions for the intent recognition module 223 and the intent completion module 214 are trained using labeled training data that includes past queries from users, synthetically generated example queries, or queries generated for the purpose of training. The training data may include prefixes of the queries as well (i.e., portions of the sample queries). Labeled training data for intent completion includes example training queries that are broken into prefixes as input data and suffixes as the target output so that the intent completion module 214 can be trained to predict suggestions for the user based on partial user queries. For example, the query "Order me some food" would be broken into training substrings of "Order" 4 "me some food", "Order me" 4 "some food", and "Order me some" 4 "food". In a similar way, the models can be trained on sub-word data to predict suggested completions when the user has only partially entered a word. In one embodiment, the training queries are labeled with one or more applicable intents or are labeled with special designations such as "other" (to indicate an intent outside of the supported set of intents), "incomplete" (to indicate that no known intent is yet implied by the query), or "reject" (to indicate a query that is too noisy to be able to provide a prediction).

The intent recognition module 223 and the intent completion module 214 may use various combinations of semantic similarity models and direct intent classification modules in different embodiments. Model architectures may include logistic regression models, support vector machines, and gradient boosted decision trees, as well as trained neural networks and encoders. Semantic similarity models use specified sets of preferred queries that are associated with each intent and train the neural network (or other model architecture) to recognize similarities among queries and partial queries associated with certain intents. Direct classification models accept a query or partial query as input and are trained to output one or more of a fixed set of classifications, where each class corresponds to either an intent or an "out of domain" class (i.e., an unknown or undetermined intent). The models may be trained to be used together or separately to recognize intents and to classify (i.e., predict) the intents. In one embodiment, the model outputs for semantic similarity and direct classification models may be trained independently, their predictions may be merged and provided as input to a neural network that produces a final intent prediction. This system may be trained using the labeled training queries to generate loss values to backpropagate through the neural network and adjust network weights during training. In one embodiment, a first model is trained to use only queries as input and a second model is trained to use both the queries and the output of the first model as input, and a final intent prediction is produced. In some embodiments, intent completion models may be language models or sequence to sequence models built using neural networks that are trained to predict the next token or tokens given the tokens mentioned so far in a partial user query.

The intent completion module 214 may access trained neural networks that produce intent predictions given the partial input query and, in some cases, additional metadata related to the partial input query. In one embodiment intent completion module 214 may preprocess the input data and convert it into an embedding that can be used as input by one or more of the trained machine learning models. Input may include a tokenized partial query, the physical context of a user (e.g., location, time, devices in use, motion), and historical context information (e.g., past user queries and frequently used domains, intents, and entities of the user and similar users). In some embodiments, the morphing interface system 130 uses the intent recognition module 223 of the natural language processing module 220 to predict the user's intent. On receiving the user's query from the client device 110, the natural language processing module 220 triggers the intent recognition 223 module and the entity recognition module 225 which recognizes the intent or ranking of possible intents, and sends these intents and the partial query to the intent completion module 214. The intent completion module accesses the corresponding ruleset or data structure associated with the received predicted intent and pulls the top matches for the partial query (as in embodiments using the rule-based approach) or feeds the partial query and predicted intents to a model (or set of models, for each intent) that generates intent completions for the input (as in embodiments using the model-based approach).

Using a model-based approach, the intent completion module 214 may output one or more predicted intents and the corresponding intent completions for the user's partial query, or intent templates. In some embodiments, the output of a model may be a list of intent-suggestion pairs, wherein the intent is the task for execution that is predicted to be indicated by the user query and the suggestion may be a test string that represents the predicted intent to display for selection to the user at the client device 110.

In some embodiments, by using a combination of rule-based and model-based approaches, the system is able to offer rapid customization without having to immediately retrain the models used for natural query completion. If the user enters a new query (e.g., through typing or speaking) for which the intent recognition system accurately predicts an intent (or set of intents) but the pattern of the query is new for the intent completion module 214 and the models of the intent completion module are not able to generate a sensible intent completion for a prefix of the user's new query, then the new query may be decomposed and added to the rulesets and/or data structures corresponding to the predicted intents. In future, when the context-aware query completion system 210 identifies a prefix of the query in the future, it can accurately predict an intent completion or intent template based on the saved information about the user query. Furthermore, if the intent recognition module 223 does not accurately interpret the user's desired domain or intent, the user can provide quick feedback of the correct intent for this partial query. The intent completion system may subsequently normalize and add the user's previously unrecognized query to the user-specific knowledge base 250 that contains rulesets for custom intent completions for each user. A future partial or full input of this unrecognized query by the user will be recognized and can lead to both accurate predictions of the domain and intent as well as an accurate query completion.

As a further example, if a user inputs a query that the intent recognition module 223 cannot correctly infer (e.g., "Fly me home for winter break"), the context-aware query completion system 210 may initially fail to generate a completion for the query. However, if the user subsequently attempts to express the query in a different form that the morphing interface system 130 can interpret (e.g., "Book me a flight home for winter break", the NLP module 220 may store information associating the concepts of the two differently formatted input queries. That is, if a determined semantic and/or syntactic similarity is higher than a threshold amount, the NLP module 220 may store an association or mapping between the two queries for future use. Specifically, the NLP module 220 may decompose the newly received query to remove specific entities and lead-ups (e.g., <LOCATION>, and "from"/"to") for intent recognition and completion, and may use the learned positions and types of the entities for future use in entity suggestion. In some embodiments, these relations may be managed by the knowledge base manager 233 in the interpolation module 230. When a user subsequently attempts to input the query that previously failed, the morphing interface system 130 can correctly infer the user's intent and may provide corresponding intent and entity completions for prefixes of the query based on the stored information about the query format (e.g., if the user provides partial input "Fly me . . . " the morphing interface system 130 may provide a suggested intent completion of "to <DESTINATION_LOCATION>".

In order to maintain simplicity and maximize utility, in some embodiments, the intent completion module 214 may suggest at most a predetermined threshold number of possible intents that may be associated with a user input query (e.g., a number that fits in a list on a user device screen and/or that may have high relevance such as 2 to 5 intents). The intent completion module 214 may be configured in different ways to determine which of a set of possible intents to suggest to a user. In one embodiment, the selection of suggested intents is determined in view of semantic diversity of the predicted possible intents. To provide increased utility to a user, intent suggestions that are presented to the user at the client device 110 should be diverse. The intent suggestions may be grouped as a set. By way of example, in response to a partial query of, "book me" it is more helpful for the user to receive suggested completed intents of "book me a flight" and "book me a table" rather than "book me a flight" and "book me a private jet." In one embodiment, the intent completion module 214 is configured to select opposing intents for presentation to the user. That is, the completion module 214 may select intents that, when executed may have opposite or differing results (e.g., execution of tasks related to the intents may access different APIs). This can also be beneficial for responding to user queries that are predicted to be in a logistical domain, for example, the intent completion module 214 may suggest an intent of "cancel the transaction" as well as the intent of "open a new transaction." In one embodiment, the set of predicted intents to present as suggestions to the user may be selected based on stored user profile data about the querying user, such as user device interaction behavior and user navigation patterns. In some embodiments, the intent completion module 214 selects which of a set of predicted user intents to suggest to the user based on the user's query history. For example, if the user has a history of ordering food over ordering a ride-sharing vehicle, the intent completion module 214 may prioritize suggestion of intents that are related to takeout and food orders. In some embodiments, the intent completion module 214 may select those intents that have a highest predicted likelihood (e.g., as determined by a trained machine learning model) of being associated with the user input query for providing as suggestions to the user (e.g., the top 5 most likely intents).

The entity completion module 216 manages collection of entity values that are needed by the context-aware query completion system 210 for executing an intent. In one embodiment, entity collection may be performed after an intent has been determined by the intent completion module 214 or once an intent has been selected by the user. In other embodiments, entity collection may be performed in parallel or even before intent determination to help determine the user's intent with further accuracy (e.g., determining some entity values can help the intent recognition module 223 to refine predicted domains and intents associated with the input). An entity is an input parameter to an intent. To execute an intent, or to cause an intent to be executed, the context-aware query completion system 210 collects values for each entity associated with the intent. In some embodiments there may be an entity recognition subsystem within the natural language processing module 220 that collects values for entities associated with the intent, while the context-aware query completion system 210 may only predict candidate values for entities whose values have not yet been provided by the user.

In some embodiments, the entity completion module 216 is configured to do for entities what the intent completion module 214 is configured to do for intents. That is, the entity completion module 216 generates suggested entities to recommend to a user. The entity completion module 216 may also determine which of a set of required entities associated with an intent have been provided in the user input already and which still need to be collected. As described previously, the context-aware query completion system 210 may store sets of entities and concepts that are associated with each intent as well as interfaces associated with the intent for prompting a user to enter appropriate entity values for execution of the intent.

Like the intent recognition module 223 and the intent completion module 214, the entity recognition module 225 and entity completion module 216 recognize and predict entity values using neural networks and/or other machine learning models. The entity recognition module 225 and the entity completion module 216 models are trained using labeled training data that includes example queries and prefixes of the same queries. The queries or query prefixes have training labels that identify the location of entities and entity values in the query. The entity completion training data has a similar structure to the intent completion training data, but involves possible suffixes of a complete intent query followed by possible subsets, permutations, and combinations of entities and terms leading up to entities. For example, possible suffixes of "Order me food" are "Order me food", "me food", and "food". If an expected full completion of the query with entities is "Order me food to my house from Veggiepalace" then the entities are "location" (my house) and "restaurant" (Veggiepalace) and the lead up terms to these entities are "to" and "from". The example training queries may include labels identifying the entities and lead up terms to train the models to identify the entities and to predict entities for the user.

Entity recognition models can be trained as sequence taggers, pointer networks, or as conditional random fields in some example embodiments. For sequence tagging models, the query is decomposed into a distributed representation of character, sub-word, word, phrase, or sentence level tokens and each token is assigned tags that identify whether the token is at the beginning of the entity, inside the entity, or outside of the entity (i.e., not a part of an entity). For pointer networks, the network is trained to provide pointers to elements of the input query with associated labels. In the case of conditional random fields, conditional distributions are combined with an undirected graph structure to model feature dependencies between nearby words and phrases in the input query, as well as the labels (predicted entities) of nearby words. In various embodiments, the entity recognition models and entity completion models may include logistic regression models, support vector machines, and gradient boosted decision trees, as well as trained neural networks and encoders. Entity completion models may be language models or sequence to sequence models built using neural networks that are trained to predict the next token or tokens given the tokens mentioned so far in a partial user query.

The entity completion module 216 generates suggested entity values to recommend to a user. By providing recommended entity values to the user, based on partially entered input and/or user profile and contextual information, the entity completion module 216 can shorten the time it takes for entity values to be collected for execution of an intent. The entity completion module 216 can also help the user by raising awareness of the possible entities they can mention to further narrow/filter their intent. In one embodiment, the entity completion module 216 may include a recognition subsystem and a prediction subsystem. In another embodiment, this recognition subsystem may reside in the natural language processing module 220. The entity completion module 216 may use the recognition subsystem to determine which entities of the determined intent already have associated values provided by the user. If additional entities associated with the intent do not have assigned values, the prediction subsystem may predict entity values the user is likely to select so that the morphing interface system 130 may provide the predicted entity values as suggestions to the user. In addition to providing the entity value itself, the prediction subsystem may also provide a leadup and an alias for displaying in the interface to the user that help clarify the suggested entity value and make it fit into the user's partial query. For example, if the user has provided "Book me a flight" as input, the recognition subsystem will inform the prediction subsystem that no entities have been included in the user input. The prediction subsystem may subsequently provide a suggestion, "from <START_LOCATION>", "SFO, SJC, OAK" as airport suggestions and may also present a question "where?" for the client device 110 to display to the user to prompt the user to provide entity value information about the start location of the requested flight. In the above example, "from" is the leadup, and the question "where?" is the alias.

To generate relevant and accurate recommended entity values for a user, the entity completion module 216 may be configured to use a rule-based approach, a model-based approach, or a combination of the two types of approaches. In various embodiments, the entity completion module 216 may accept input including typed tokens or characters from the user input string, past queries of the user, a probability distribution of past user queries, the context of the client device 110 (e.g., location, time, type of device, motion), and information about the context of the user interaction with the client device 110. In some embodiments, upon determination of an intent for execution by the intent completion module 214, the context-aware query completion system 210 may access and provide a user interface associated with the intent (e.g., a fillable form) for display to the user at the client device 110 and the entity completion module 216 may receive input values associated with entities of the intent from user inputs to the fillable interface.

In some embodiments, the entity completion module 216 may use a rule-based approach to determine which entities have already been collected for the intent. The entity completion module 216 may be configured to use rules based on, for example, regular grammars, heuristics, regular expressions, and linguistic signals and structures to identify entity values from the provided user input queries (entity completion also makes use of the same data structures that intent completion uses, such as prefix trees, ternary search trees, directed acyclic word graphs, finite state transducers). For example, if a user input query included, "Order me a pepperoni pizza" and the intent completion module 214 had determined that the intent associated with the user input query was to order food, one entity value associated with the intent may be an identification of the type of food the user wants, which in this case is identified as pizza, and further identifying the type of pizza the user wants, in this case pepperoni. The entity completion module 216 in this example, may identify the value associated with this entity as "pepperoni" using a rule based on linguistic signals and structures that specify that the adjective included before the word "pizza" is likely to be the type of pizza, that is, the entity value. In some embodiments, the entity recognition subsystem of the natural language processing module would identify that the value for the <Dish-Name> entity is "pizza" and further, the desired <Toppings> is pepperoni. The entity completion module 216 may receive input that the Dish-Name and Toppings have been provided, then predict that the next high priority entity is the name of the <Restaurant>. At this point, the entity completion module 216 may generate suggestions in a form such as, [leadup: "from", entity_name: "Restaurant", entity_values:["Pizza House", "Slice of NJ", "Baggio's Pizza"], alias: "which restaurant?"]. In this example, the entity_values section is generated by the interpolation module 230, which sources information from external APIs, the global knowledge base 240, and the user-specific knowledge base 250. The interpolation module 230 may also manage construction of a meaningful sentence out of the above fields, for example when a lead-up term generated by the entity completion module 216 does not fit grammatically into the user's partial query.

In some embodiments, the entity recognition module 225 (which may be a part of entity completion module 216 or a part of NLP module 220), may use a model-based approach to determine which entities have already been collected for a selected intent. The entity recognition module 225 may be configured to use, for example, a named entity recognition (NER) implementation, course grained entity extractors, fine-grained entity extractors, and/or external knowledge for linking extracted entities from the user input to known real-world entity values. For example, a machine learning model may be trained to classify certain parts of user input as likely entity values.

Once the entity recognition module 225 has determined a set of entities associated with the intent that still need input values, the entity completion module 216 may proceed to generate suggested entity values to present to the user for the remaining entities. In one example embodiment, the entity completion module 216 may access a lookup table stored in association with the intent. The lookup table may store a mapping of entities to their associated lead-up terms, aliases, and order of priority with respect to the intent. Entities that have already been collected may be removed from the priority list and the entity completion module 216 may generate suggestions for the entities of next highest priority on the list. In one example embodiment, the entity completion module 216 may reformat a partial query and feed the result into a dictionary, prefix tree, or a variation of acyclic deterministic finite automata such as a directed acyclic word graph to determine an entity to be suggested next. For example, using such a rule-based approach, the example partial input could be "book me a flight to JFK", the predetermined rules may be used to convert this input using natural language processing techniques to recognize the format "to <END_LOCATION>" which a rule tree may then be used to lead to the associated structure "from <START_LOCATION>" indicating that a start location is the next entity to request from the user. In some example embodiments, an entity for suggestion may be determined using a model-based approach. In such embodiments, a trained machine learning model such as a fine-tuned language model or an ensemble of models may be employed to recognize the lead-up terms, aliases and orders of priority for the entities of an intent, removing the need for a lookup table. For example, a set of collected entity values may be provided along with a partial user input query as inputs to a machine learning model that is trained to output a next entity for suggesting to the user. In one embodiment, optimization schemes such as beam search decoding, top-k sampling or A-star search may be used to search and select one or more of the most relevant suggested entities and/or entity values to recommend to the user.

The interpolation module 230 predicts additional information about suggested intents and suggested entity values to present to the user at the client device 110. In addition to specific executable intents, the intent completion module 214 may generate intent templates as suggestions for the user. An intent template is a generalized intent that indicates a broad concept of the function a user wishes to execute via the intent but which requires additional information from the user to be resolved into a specific intent. Intent templates may be needed for domains where the intent is expressed more by the entity of interest than by the partial query preceding it. For instance, when the user says "Buy me", some possible intents are flight booking, food ordering, and online shopping. The intent completions for these would be "Buy me a flight ticket", "Buy me<FOOD>" and "Buy me<PRODUCT>" respectively. The latter two can be expressed in an entity-free manner and without an intent template—"Buy me food" or "Buy me stuff online". However, these completions are not narrow and intent oriented, and do not encourage the user to provide additional context. For instance, if the intent completion for food was "Buy me food" and the user still wanted to say "pizza", the final query would be "Buy me food, pizza" since "Buy me food" was already suggested by the morphing interface system, and such constructions may be grammatically confusing to the user.

As another example, given a partial input query such as, "order me" the intent completion module 214 may have determined that a likely user intent is a food delivery order. However, an executable intent may need to include a specific restaurant or type of food and the intent completion module 214, not having enough information to identify or recommend a specific restaurant, may generate an intent template, "order me<FOOD>" to suggest to the user. The interpolation module 230 generates predicted values to complete intent templates so that the final suggestion presented to the user may be a specific intent. In some embodiments, the context-aware query completion system 210 may provide an intent template as a suggestion to the user without input from the interpolation module 230. The interpolation module may access data from the global knowledge base 240, the user-specific knowledge base 250, and external data sources to determine specific intent values to fill in the intent template. In some embodiments the interpolation module 230 may work with a knowledge base manager 233 that handles retrieval of data from the global knowledge base 240 and user-specific knowledge base 250. In one example embodiment, the interpolation module 230 may access an interpolation machine learning model or other trained or preset weighting scheme for populating the intent template. Continuing the above example, the interpolation module 230 may determine, based on information from the user-specific knowledge base 250 that the requesting user frequently orders pizza, the interpolation module 230 may fill in the intent template "order me<FOOD>" such that the intent to be presented to the user at the client device 110 reads "order me pizza." In some embodiments, the interpolation module 230 may similarly help the entity completion module 216 to predict entity values for suggestion to the user based on global user knowledge, specific user knowledge, and other contextual information.

Generally, the interpolation module 230 may also be configured to populate a natural language query, rather than an intent template in the user interface. That is, the interpolation module populates an intent template when there is a high degree of certainty of the user's intent—since the user may only be able see one intent template at a time in some embodiments. In other cases, the interpolation module 230 may populate or suggest completions to the user input.

The global knowledge base 240 comprises one or more databases of general knowledge stored by the morphing interface system 130 for use by the context-aware query completion system 210, the interpolation module 230, or other modules. In various embodiments, the global knowledge base 240 may include data about ontologies and taxonomies for use in predicting entities and intents, that is, with respect to domains. That is, in some embodiments, the information stored in the global knowledge base 240 may be stored as a knowledge graph, which is a data structure that stores the data following the semantic framework of an ontology. For example, the global knowledge base may store information about the relationship between the word "shoes" with the concepts of footwear, and relevant data related to the concept of footwear like brands, sizes, prices, colors, etc. In some embodiments, the global knowledge base 240 may include contextual information, for example, current events, local businesses, and regional linguistic patterns.

The user-specific knowledge base 250 comprises one or more databases of user data stored by the morphing interface system 130. In some embodiments, the information stored in the user-specific knowledge base 250 may be stored as a knowledge graph, i.e., stored in a graph data structure that stores data following the semantic structure of an ontology. In some example embodiments, the user-specific knowledge base 250 may store user profile data associated with one or more users of the morphing interface system 130. User profile data stored by the user-specific knowledge base 250 may include past user interactions with the morphing interface system 130, user preferences, user behavior, and linguistic or speech patterns associated with a user's interactions with the morphing interface system 130. This information may be anonymized and scrubbed to remove all personally identifiable information.

Figure 3:
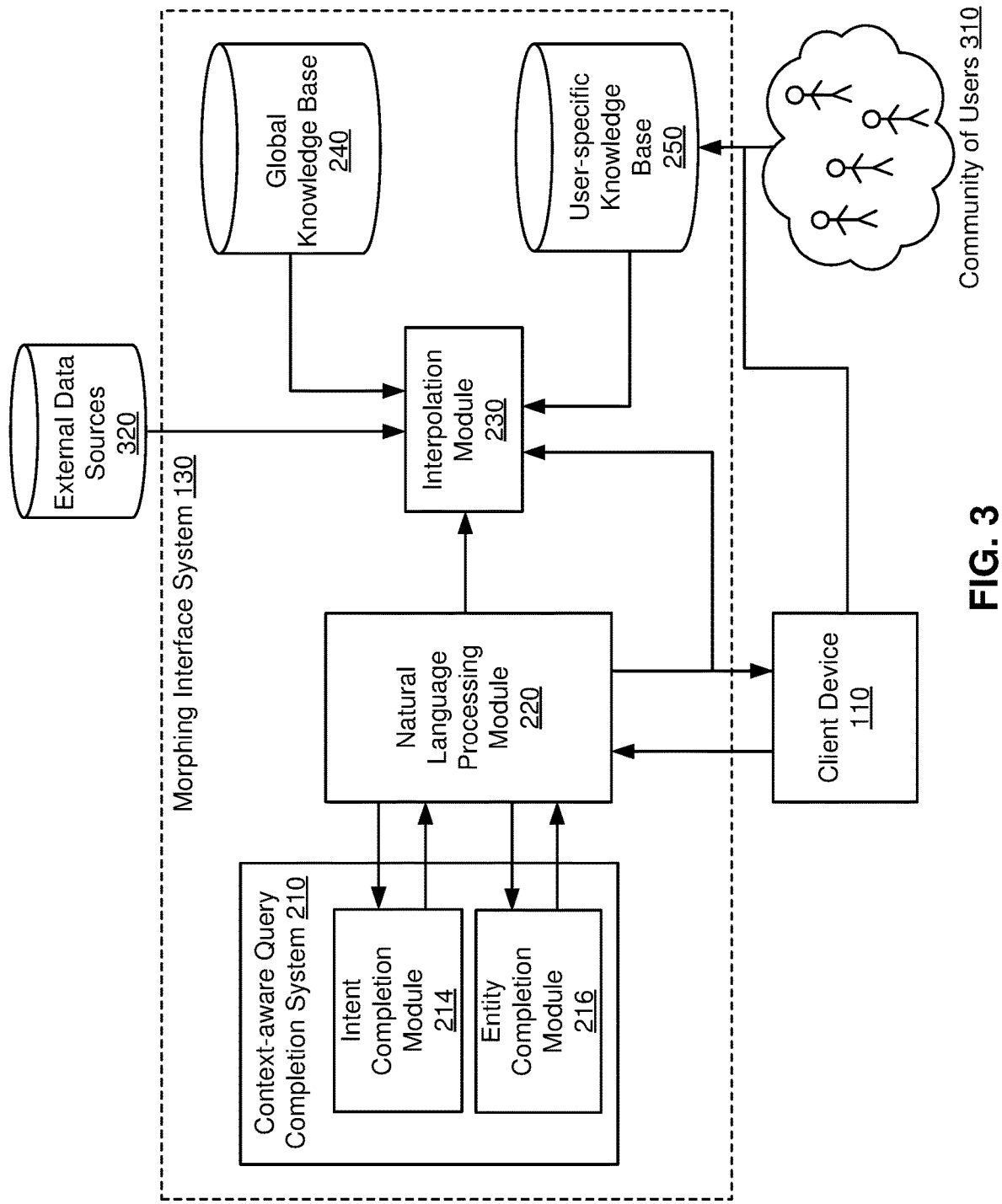
FIG. 3 is a high-level block diagram illustrating interactions among components of the morphing interface system within a system environment, in accordance with an example embodiment.

FIG. 3 is a high-level block diagram illustrating interactions among components of the morphing interface system 130 within a system environment, in accordance with an example embodiment. The morphing interface system 130 receives partial input queries from a user via the client device 110. The NLP module 220 analyzes the partial input and generates metadata comprising natural language processing signals associated with the partial input. The NLP module 220 may also analyze and identify predicted user intents and entities based on the received user input. The partial input, generated metadata, and information about predicted intents and entities is received at the context aware query completion system 210.

If the natural language processing module 220 did not have enough information from the partial input to predict a likely intent of the user, the intent completion module 214 generates a set of one or more intents or intent templates to suggest to the user. In one embodiment, the morphing interface system 130 may provide an interface for the client device 110 to display to the user at a client device 110 for entering entity values associated with a predicted intent with a highest determined likelihood of being related to the partial user input query, thus "morphing" the interface at the client device as additional user input is provided. This may include switching to a different interface when, in response to receipt of additional user input, a new intent is determined to be more likely to be related to the partial user input. The intent completion module 214 provides one or more of the suggested intents to the client device 110 for presentation as suggestions to the user. In some embodiments, as shown in FIG. 3, the intent completion module 214 may provide suggested intents to the client device 110 via the NLP module 220 which may collect data about the predicted intents with respect to the partial input and may further format the suggested intent for display at the client device 110. If one or more of the suggested intents from the intent completion module 214 is an intent template, the NLP module 220, may provide the intent template and accompanying metadata about the partial input to the interpolation module 230. The interpolation module 230 may be used in two cases. First, if an intent template is generated by the intent completion module 214, and there is an entity within the intent completion that needs relevant values to be filled in before it can be suggested to a user. Second, if an intent has been selected and the context-aware query completion system 210 has proceeded to entity completions, the interpolation module 230 may be used to identify and fill in entity completion values for the next entity that is needed to execute the intent. The interpolation module 230 generates predicted values for completing the intent templates. In some embodiments, to generate the predicted values for completing intent templates, the interpolation module 230 may access the global knowledge base 240, the user-specific knowledge base 250, or other external data sources 320. External data sources 320 may be sources such as websites, third-party data stores, and data feeds that provide additional contextual data for the interpolation module 230. As shown in FIG. 3, the user-specific knowledge base 250 may include data associated with a plurality of users, sometimes with similar traits as a primary user, from a community of users 310 of the morphing interface system 130 and interactions of those users with the morphing interface system 130 via their respective client devices 110.

The user either selects a suggested intent provided at the client device 110 (e.g., by tapping or clicking on (or otherwise making an affirmative selection of) a presented selection or finishing typing to match a presented selection) or the user is not satisfied with the presented intent suggestions and continues typing (or otherwise providing additional input). In the case that the user continues typing and providing additional input to the partial input, the client device 110 provides the additional partial input back to the natural language processing module 220 which, in cooperation with the intent completion module 214 and the interpolation module 230, repeats the process of predicting likely intents and returning the new predictions to the client device 110 for presentation to the user. Furthermore, if the user was not satisfied with any of the suggestions and continued providing additional input through the completion of the query, the final query may be stored at the user-specific knowledge base 250 in association with a profile of the user so that the context-aware query completion system 210, the natural language processing module 220, and the interpolation module 230 may be trained to recognize the input pattern for responding to future queries.

To store a new query in the user-specific knowledge base, the completed query may be pre-processed to replace all entity values with their corresponding placeholder names (e.g. "pizza" may be replaced with <FOOD>), scrubbed to remove personally identifiable information, and compared against existing candidate suggestions available for selection by the trained machine learning models of the natural language processing module 220 and context-aware query completion system 210 as well as against query paths in rulesets. If no semantically similar matches are found in relation to the existing machine learning models and/or rulesets, a new path or branch may be added into a stored user-specific ruleset for the intent, and/or the pattern may be used to generate training data retraining the machine learning model(s) to predict likely intents for suggestion to the user. During a knowledge base expansion process, if a semantic similarity model produces a low score for a semantic similarity between a given input query and the designated preferred queries for the relevant intent, the new query may be marked for use as labeled training data when the model is next retrained.

If a user selects an intent that has been suggested by the morphing interface system 130, the user's client device 110 may notify the morphing interface system 130. In one embodiment, the NLP system 220 analyzes the received user input and sends the user input to the context-aware query completion system 210 along with metadata comprising NLP signals generated based on the input by the NLP system 220 for the entity completion module 216 to use to determine entity values. The entity completion module 216 may determine that some or all of the entities associated with the selected intent are already expressed in the existing user input. If some entity values are still needed to execute the intent, the entity completion module 216 may generate suggested entity values for presentation to the user. In some embodiments, the interpolation module 230 may access the global knowledge base 240, the user-specific knowledge base 250, and/or external data sources 320 to further refine suggested entity values for presentation to the user based on user preferences and contextual information.

When an intent has been selected, the entity recognition module 225 may identify entity values in the partial user input and the entity completion module 216 may generate predicted entity values and entity templates to suggest to the user in view of entity values that are not included in the partial user input. To identify information about the entity values, the entity completion module 216 and entity recognition module 225 may interact with the knowledge base manager 233. The knowledge base manager 233, a subsystem associated with the interpolation module 230 may access information about entity values by indexing, cleaning, and retrieving information from the global knowledge base 240 and user-specific knowledge base 250. The knowledge base manager 233 may also query external data sources 320 and add unique obtained information and its associated entities to a global knowledge graph, such as may be stored at the global knowledge base 240. A knowledge graph is a data graph, database, or computing engine that stores data according to an ontological structure. An external data source 320 with a knowledge graph is a live or otherwise real-world data source that is stored and/or maintained by a third-party, but that is accessible for use by the morphing interface system 130. The external data sources 320 may be used when the entity recognition module 225 requires information about candidate entities, when a new entity (e.g. Shoe Size) is added as a new feature for which there's no existing information stored in relation to selected intent, or when there isn't sufficient information in the global knowledge base 240 and the user-specific knowledge base 250 for populating an entity in an intent template or in an entity template.

In some embodiments, the morphing interface system 130 stores mappings of relevant ontologies to possible intents and entities and makes use of partner APIs to access options for entity values to suggest to a user. Partner APIs may include APIs for external data sources 320 with structured data corresponding to facets of possible intents. For example, APIs accessed by the morphing interface system 130 may include APIs for shopping merchants, food delivery partners, event scheduling systems, travel providers, and the like. The APIs may expose information about categories of data (e.g., brand, cuisine, price, etc.). By having access to external ontologies associated with intents, the interpolation module 230 can make improved predictions about available entities from external sources 320 corresponding to an intent that may be of interest to a user. For domains and intents that do not have stored mappings to external sources where suggested entity values may be obtained, the morphing interface system 130 may use more general and larger scale knowledge graphs (e.g., as may be maintained by the morphing interface system 130, or as may be maintained by an external system) to both verify entity values (such as a restaurant name) and to retrieve relevant entity concepts (e.g. from a query for "egg", the system can access a knowledge graph that connects "egg" to relevant egg-based meals such as scrambled eggs, deviled eggs and more).

The entity recognition module 225 may determine whether information from external data sources 320 will be needed by the entity completion module 216 to generate suggested intents for presentation to the user. In some embodiments, the entity recognition module 225 may also determine which external data sources 320 to access based on a stored mapping of domains to external data sources 320 (e.g., as may be stored by the knowledge base manager 233). The entity recognition module 225 may be configured to determine whether there is sufficient data stored in the global knowledge base 240 and user-specific knowledge base 250 to proceed to predict suggestions for intents and associated entity values without querying external data sources 320. The suggested entity values may be provided by the morphing interface system 130 to the client device 110 for presentation to the user. As with intents, in various embodiments, the suggested entity values may be presented in different formats to the user.

In one example embodiment, the morphing interface system 130 may provide an interface such as a fillable form for the user to enter entity values associated with a determined intent. This may include, for example, suggested entity values for one or more of the fillable fields in such a form. In one embodiment, the client device 110 may prompt the user to continue typing or speaking to enter additional user input until the user input includes enough information for the context-aware query completion system 210 to predict a likely entity value for each of the entities associated with the intent. In some embodiments, as a user provides additional input, the context-aware query completion system 210, in addition to determining likely entity values, may reevaluate whether a different intent may be more applicable, via the intent completion module 214. For example, if the user said, "Take my spouse to downtown Seattle" and the intent recognition system first predicts flight booking as the intent, but then the user adds "from the office in Redmond", the intent recognition module 223 may determine, using natural language processing analysis of the additional user input, that the user intends to request a rideshare service, and the intent completion module 214 may accordingly access and provide an updated interface and/or suggested intent and entity completions into which the display at the client device can morph. The user may select suggested entity values provided by the morphing interface system 130, or, if none of the suggested entity values is applicable, the user may proceed to manually enter entity values into a fillable form interface associated with the intent, or may continue providing input in a natural language (e.g., typed or spoken) format.

When enough of the entity values associated with the selected intent have been received by the morphing interface system 130 for the intent to be executed, the morphing interface system 130 may execute the intent. In some cases, the morphing interface system 130 may not locally execute an intent, but may request that the functions of the intent be executed by different or third-party systems and may provide the entity values as input parameters for the third-party system to execute the intent.

Figure 4:
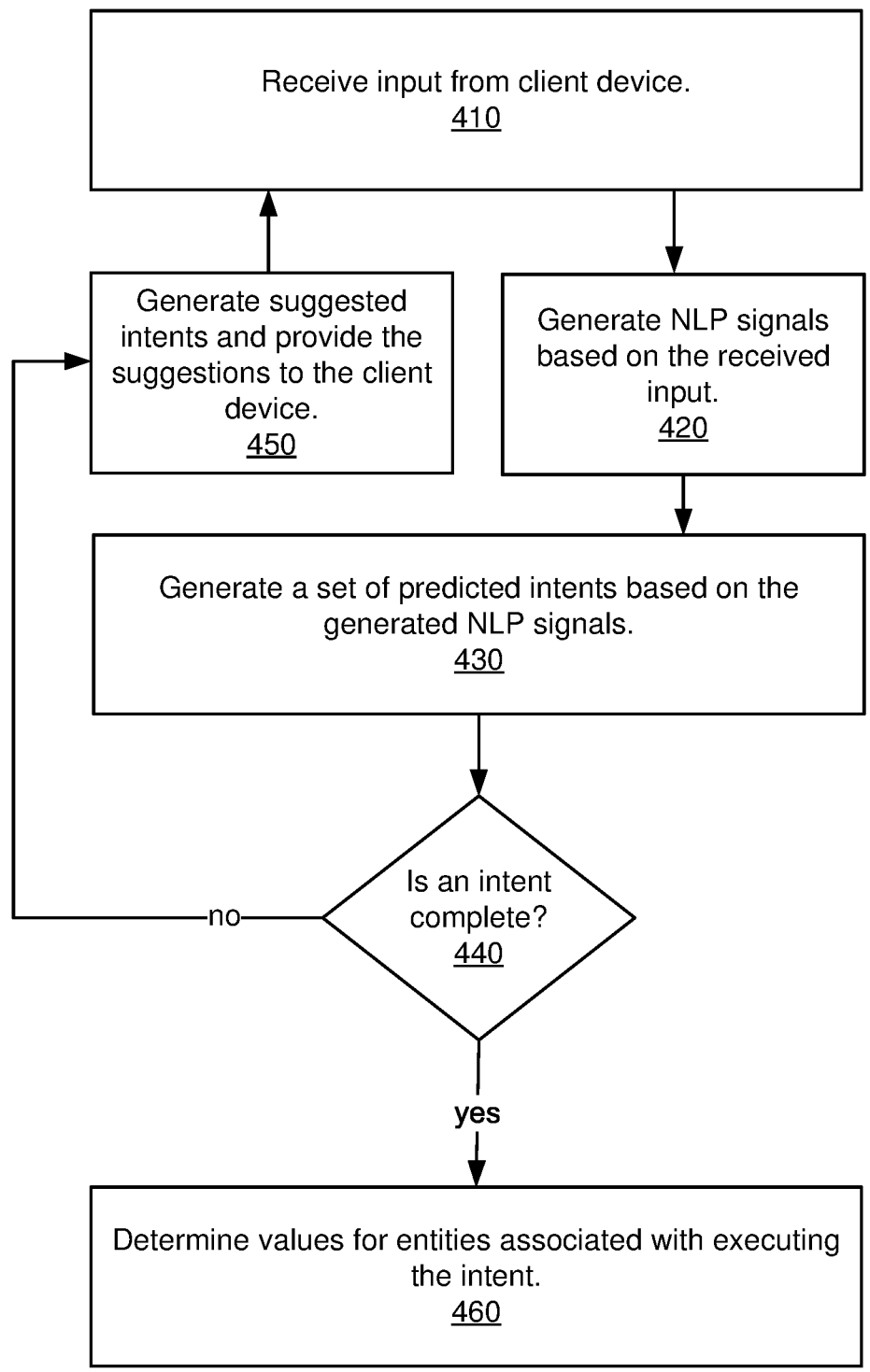
FIG. 4 is a flowchart illustrating a process determining a user intent, in accordance with an example embodiment.

FIG. 4 is a flowchart illustrating a process determining a user intent, in accordance with an example embodiment. The morphing interface system 130 receives 410 input from a client device 110. The input may include inputted (e.g., typed or digitally written via digital pen or stylus that may be digitally recognized) characters or spoken audio. The input may be received at the morphing interface system 130 as partial user input, that is, a client device 110 may continue collecting additional input supplied by a user while the morphing interface system 130 simultaneously analyzes a partial user input.

In one embodiment, when partial or complete user input is received from the client device 110 at the morphing interface system 130, it is routed to the NLP module 220. The NLP module 220 generates 420 a set of NLP signals based on the received input. In various embodiments, the NLP module may generate the set of NLP signals using combinations of different NLP techniques, including, for example, tokenization, part-of-speech (POS) tagging, dependency parsing, entity extraction, stemming, lemmatization, stopword identification, text chunking, semantic role labeling, and coreference resolution (intent and entity recognition may also occur in the NLP module).

The user input and the generated NLP signals are provided to the context-aware query completion system 210. The intent completion module 214 generates 430 a set of predicted intents based on the generated NLP signals and the user input. In one embodiment, the intent completion module 214 determines whether the user has selected a specific intent, or whether, based on the NLP signals an intent can be selected as a most likely intent (e.g., by receiving greater than a threshold probability of being the relevant intent for a given user input string). That is, the intent completion module 214 determines 440 whether an intent is complete, and thus whether the context-aware query completion system 210 can proceed with determining and collecting entity values associated with the intent (collection of entities, or entity recognition may occur at the same time as or before intent recognition, so as to determine the intent and its completeness with higher accuracy). If the intent completion module 214 determines that the intent is not complete (e.g., that the context-aware query completion system 210 has not received enough information to determine a selected intent), the intent completion module 214 generates 450 a set of one or more intents for suggestion to the user and provides one or more of the suggested intents to the client device for presentation to the user. The user may select a suggested intent, or may continue providing other input, restarting the flowchart cycle.

If the intent completion module 214 determines 440 that one of the intents is complete (i.e., that one of the intents has been selected directly by a user or has been determined to have greater than a threshold probability of being the relevant intent for the user input), the entity completion module 216 determines 460 entity values for entities associated with executing the intent. In some embodiments, determining entity values may include predicting entity values that may be relevant to the user based on past user behavior and user preferences and providing suggested entity values for presentation to the user at the client device 110.

FIGS. 5A through 5F illustrate a sequence of example user interfaces that may be presented to a user of a client device 110 as the user provides additional user input. 8

In one embodiment, the client device 110 may transition between interfaces including, for example the interfaces of FIGS. 5A-F as the user provides additional user input and as the client device 110 receives updated intent and entity suggestions from the morphing interface system 130. Thus the client device 110 may provide interfaces that appear to morph as in response to user input in near real-time.

Figure 5B:
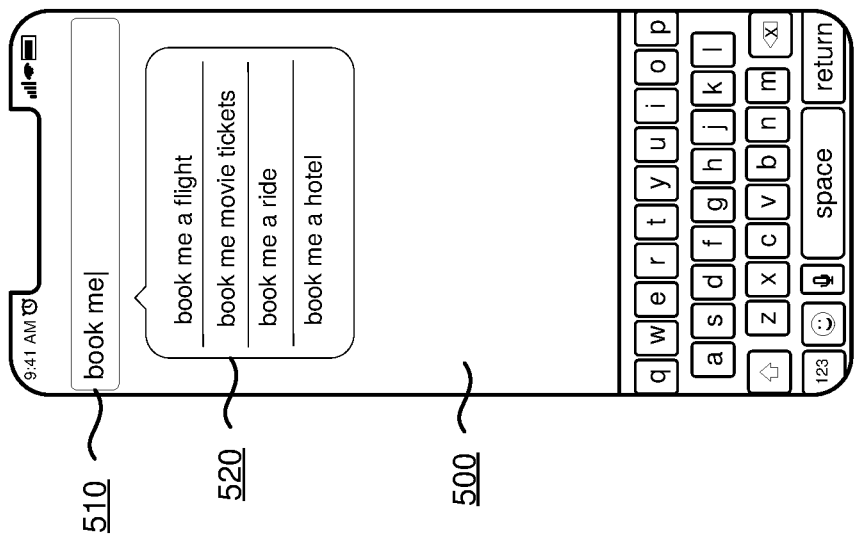
FIG. 5B illustrates a second interface for receiving user input and providing suggested user intents and entity values that is presented at the client device, in accordance with an example embodiment.
Figure 5A:
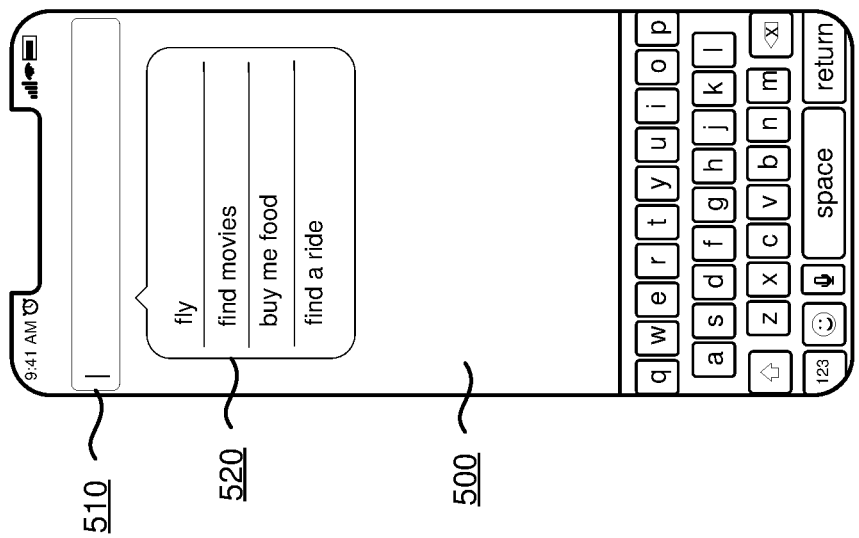
FIG. 5A illustrates a first interface for receiving user input and providing suggested user intents and entity values that is presented at a client device, in accordance with an example embodiment.

FIG. 5A illustrates a first interface for receiving user input and providing suggested user intents and entity values that is presented at a client device 110, in accordance with an example embodiment. The example of FIG. 5A includes a morphing interface 500, including an input widget 510, and a suggestion widget 520. The morphing interface 500 may change (i.e., "morph") as the user types additional input to add to the partial user input query. The morphing interface 500 may change in response to additional or altered user input without the user otherwise entering the input or requesting additional intent suggestions. The input widget 510 may accept user input, for example in the form of text or audio inputs. In FIG. 5A, the user has not yet provided any user input to the input widget 510, and the morphing interface is in its initial state. A suggestion widget 520 displays suggested user intents (or suggested entity values) to the user. The user may select the displayed user intents. In some embodiments, the client device 110 may receive suggested intents to display via the input widget 510 before the user has provided user input. In such cases, the suggested user intents received from the morphing interface system may be predicted for the user based on past user intents selected by the user, or based on other contextual or user data. In the example of FIG. 5A, the suggestion widget 520 displays suggested intents: "fly", "find movies", "buy me food", and "find a ride."

FIG. 5B illustrates a second interface for receiving user input and providing suggested user intents and entity values that is presented at the client device 110, in accordance with an example embodiment. In FIG. 5B, the user has provided a partial user input comprising a text string "book me" into the input widget 510. The client device 110 has provided the partial user input to the morphing interface system 130, and the morphing interface system 130 has determined a set of intents to suggest to the user in view of the partial user input. In the example of FIG. 5B, the intents suggested to the user at the suggestion widget 520 include "book me a flight", "book me movie tickets", "book me a ride", and "book me a hotel."

Figure 5D:
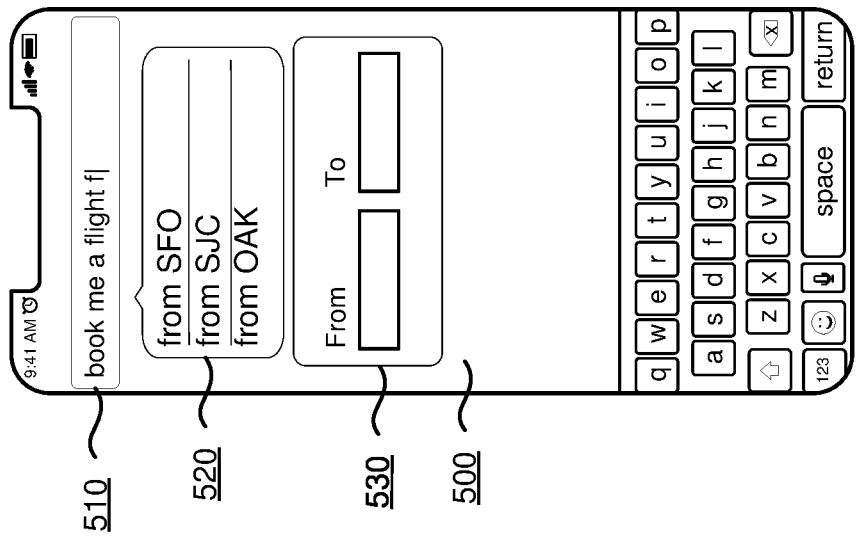
FIG. 5D illustrates a fourth interface for receiving user input and providing suggested user intents and entity values that is presented at the client device, in accordance with an example embodiment.
Figure 5C:
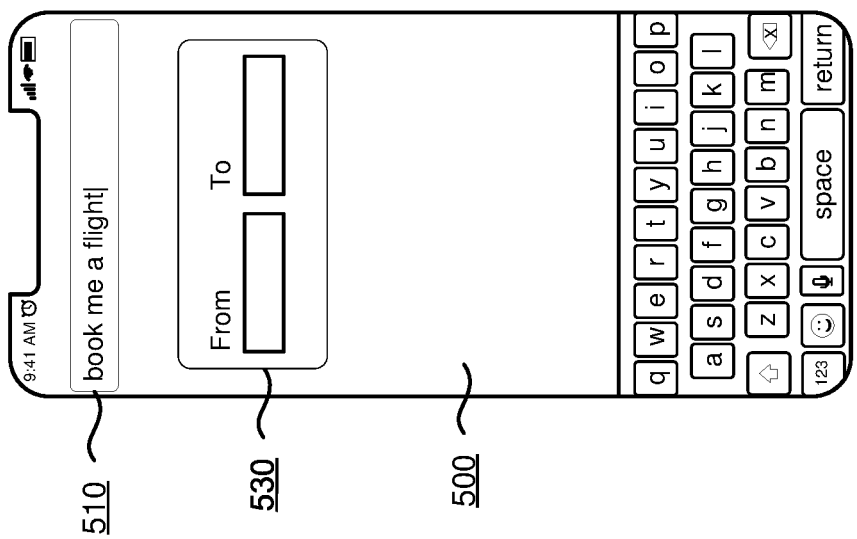
FIG. 5C illustrates a third interface for receiving user input and providing suggested user intents and entity values that is presented at the client device, in accordance with an example embodiment.

FIG. 5C illustrates a third interface for receiving user input and providing suggested user intents and entity values that is presented at the client device 110, in accordance with an example embodiment. Between FIG. 5B and FIG. 5C, the user has selected the suggested intent "book me a flight" that was presented in the suggestion widget of FIG. 5B. The user may alternatively have typed the intent to match the input to the suggested intent. After the selection of the intent, the input widget 510 became populated with the user input string representing the selected intent. In the example of FIG. 5C, the morphing interface 500 has morphed to display an entity value collection interface 530 prompting the user to provide entity values that are needed to execute the intent. In FIG. 5C, the entity value collection interface 530 includes a prompt to indicate the arrival and departure locations of the flight.

FIG. 5D illustrates a fourth interface for receiving user input and providing suggested user intents and entity values that is presented at the client device 110, in accordance with an example embodiment. In the example of FIG. 5D, the user has opted to continue typing input into the input widget 510 to provide the entity value information rather than entering the data into the entity collection interface 530. The partial user input now includes "book me a flight f" and the morphing interface 500 includes an updated suggestion widget 520 including a suggested entity value generated by the morphing interface system 130 for suggestion to the user in view of the updated partial user input. In the example, the suggested entity value includes "from SFO" as an entity value to fulfill information about the departure airport entity.

Figure 5F:
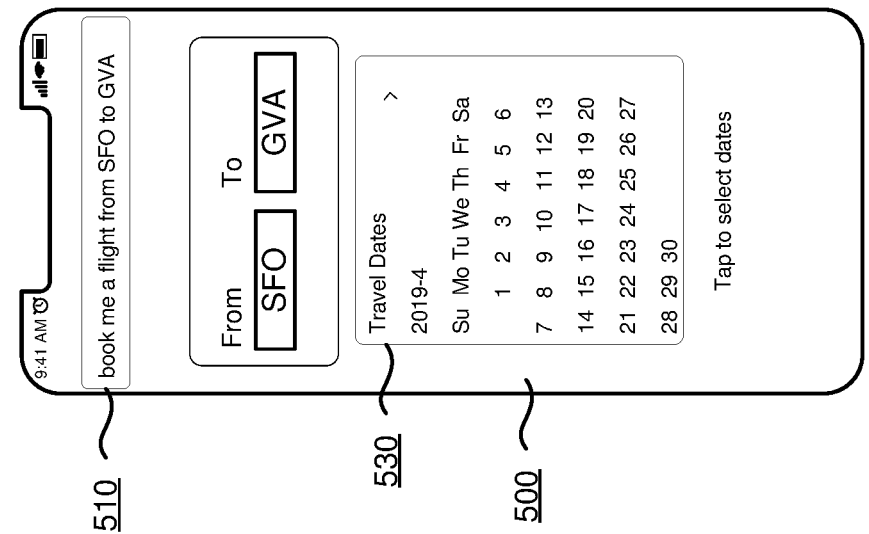
FIG. 5F illustrates a sixth interface for receiving user input and providing suggested user intents and entity values that is presented at the client device, in accordance with an example embodiment.
Figure 5E:
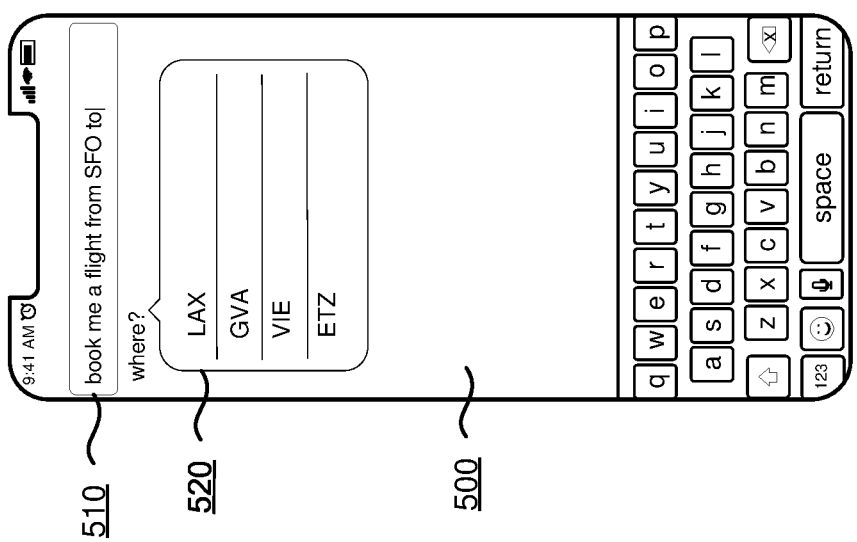
FIG. 5E illustrates a fifth interface for receiving user input and providing suggested user intents and entity values that is presented at the client device, in accordance with an example embodiment.

FIG. 5E illustrates a fifth interface for receiving user input and providing suggested user intents and entity values that is presented at the client device 110, in accordance with an example embodiment. In the example of FIG. 5E, the user has selected the suggested entity value of "from SFO" as the departure airport, and the partial user input is updated to include "book me a flight from SFO to". The morphing interface 500 of FIG. 5E includes a new suggestion widget 520 populated with suggested entity values of possible destination airports "LAX", "GVA", "VIE", and "ETZ". In one embodiment, the suggested entity values may have been determined by the entity completion module 216 and the interpolation module 230. For example, the entity completion module 216 may determine that, based on the partial user input, a suggested entity will likely need to be a template entity "to <AIRPORT>" and the interpolation module 230 may determine the specific set of airports to provide as suggested entity values based on stored data about the user, other users, and the context of the request.

FIG. 5F illustrates a sixth interface for receiving user input and providing suggested user intents and entity values that is presented at the client device 110, in accordance with an example embodiment. In FIG. 5F, the user has selected the suggested entity "GVA" as a destination location and the input widget 510 has accordingly been updated to include "book me a flight from SFO to GVA." Having collected the entity values for departure and destination airports, the morphing interface system 130 may provide another entity collection interface 530 for collection of another entity value associated with the selected user intent. In the example of FIG. 5F, the new entity collection interface 530 is a calendar through which the user may enter travel dates. In one embodiment, the entity collection interface 530 may show suggested entity values in such a calendar format, for example by emphasizing (e.g., in bold font, greying out other dates) those dates that the user is predicted to want to travel. Once the entity values associated with the selected intent have been collected via the morphing interfaces of the morphing interface 500, the morphing interface system 130 may execute the intent. In the provided example, execution of the intent may include booking a flight for the user on user-selected dates from airport code SFO (San Francisco, California, USA) to airport code GVA (Geneva, Switzerland).

Additional Example User Interface Renderings and Operations

In various example embodiments, the morphing interface system may include additional example user interfaces that are rendered (or enabled for rendering) on a screen, e.g., of the client device 110, and functionalities (or operations) that are enabled through interaction, e.g., by a user, with the user interfaces. Depending on the embodiment, a user may interact with the user interfaces, for example, by providing inputs that may include spoken word (e.g., "hold to speak") and/or typed input strings (e.g., "tap to type"). The morphing interface system 130 uses the words input by the user to generate interfaces that can guide the user to input entity values associated with a user intent.

Figure 6C:
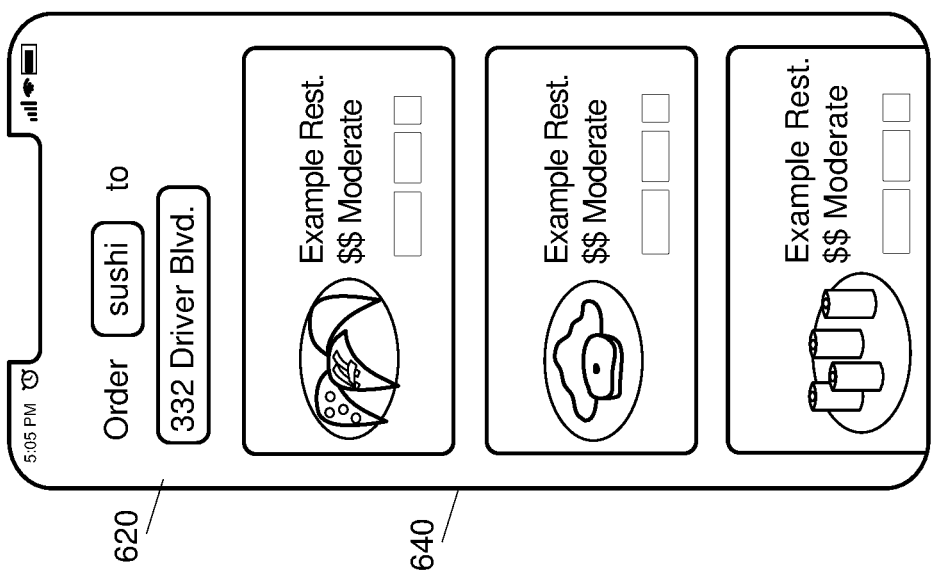
FIG. 6C illustrates a next example user interface for receiving user input and presenting options for the user based on a predicted user intent.

FIGS. 6A-6C illustrate another sequence of example user interfaces that may be presented to a user of a client device 110 as the user provides input. In one example embodiment, the interfaces are user interfaces presented for display on a screen of a client device 110, e.g., a smartphone, tablet, laptop, or desktop computer. FIGS. 6A through 6C show an example in which a user is entering user input in the form of spoken audio that the morphing interface system 130 converts into a text string, and in which the interface changes to provide suggested user intents and entity values and to provide a further interface for collecting entity values once a user intent has been selected. In some example embodiments, the morphing interface system 130 identifies variables (i.e., entities) associated with a predicted user intent that the user has included in the user input. The morphing interface system 130 may present these entity values in the form of buttons to the user, for example, within the context of presenting the entered user input string. Note that although buttons are described as an example herein, the entities may be presented as any visual characteristic that is changeable, and may be active elements of a user interface. The user may be able to select a button representing a particular entity value to make changes to the value associated with the entity.

Referencing FIG. 6A, it illustrates an example user interface for receiving user input and presenting options for the user based on a predicted user intent. In the example of FIG. 6A, the user has provided input in the form of a spoken string of words 610 which the client device 110 or the morphing interface system 130 may convert to a text string for analysis. In response to the user input, the morphing interface system 130 has determined a user intent of ordering sushi for delivery. The morphing interface system 130 provides data for the client device 110 to present an interface to the user including an analyzed input string 620 that includes buttons 630 representing values of entities. That is, the presented interface may show an annotated version of the provided user input 610 which includes an indication of the entities and associated values that the morphing interface system 130 detected in the user input. In the example of FIG. 6A, the entities include a type of food "sushi" and a delivery location "779 Lane st, Maintown". In some embodiments, the interface may comprise two regions, an input region, displaying information about the input string, as demonstrated by the analyzed input 620 in FIG. 6A, and a user interface region 640 that displays interface options for prompting the user to provide further information needed for execution of a determined user intent. In the example of FIG. 6A, the user interface region 640 includes a scrollable list of restaurant options that can provide sushi delivery to the indicated address. Changes to an entity value via user interactions with the interface region 640 will change the entity values displayed in the input region and changes to values in the input region will likewise lead to changes in which interfaces are displayed in the input region for collecting further entity data.

Referring next to FIG. 6B, it illustrates a next example user interface for receiving user input and presenting options for the user based on a predicted user intent. In FIG. 6B, the user has selected the button 630 from FIG. 6A indicating that the user wants to edit the entity value associated with the delivery address entity. In one example embodiment, the user interface morphs to show an editable (or selectable for change) input string 650, that allows the user to change values associated with the intent by editing the input text. For example, in FIG. 6B, the words from the user's spoken input 610 "my house" are highlighted since they are the words that the morphing interface system 130 associated with the delivery address entity. In addition to the option of retyping information in the input string, the user may also be presented with a suggestion widget 660. The suggestion widget 660 may be presented in the interface region of the interface. In the example of FIG. 6B, the suggestion widget 660 includes alternate values suggested to the user as delivery destinations, as predicted by the intent completion module 214 and/or the entity completion module 216. The suggestions could be alternative values from the user's interaction history, stored user provided data, the user's contact list, or other saved addresses or locations or the current location of the user.

FIG. 6C illustrates a next example user interface for receiving user input and presenting options for the user based on a predicted user intent. In FIG. 6C, the user has selected one of the suggested alternate delivery destinations from FIG. 5B. The input region of the interface has morphed back into a representation of an analyzed input string 620 with buttons (in this example) representing the detected entity (or actionable variable) values. The button for the delivery destination has been updated to reflect the user's change to the updated entity value. It is noted that the button may be selectable and may be represented in alternate visual characterizations such as differing font color of text, underlined text, and/or highlighted text. In addition, it is noted the text may be replaced by alternate characters that may be selectable such as an emoji. For example, rather their "flight" the character of a "airplane" that is selectable may be used. The interface region 640 displays updated interface options accordingly.

Figure 7B:
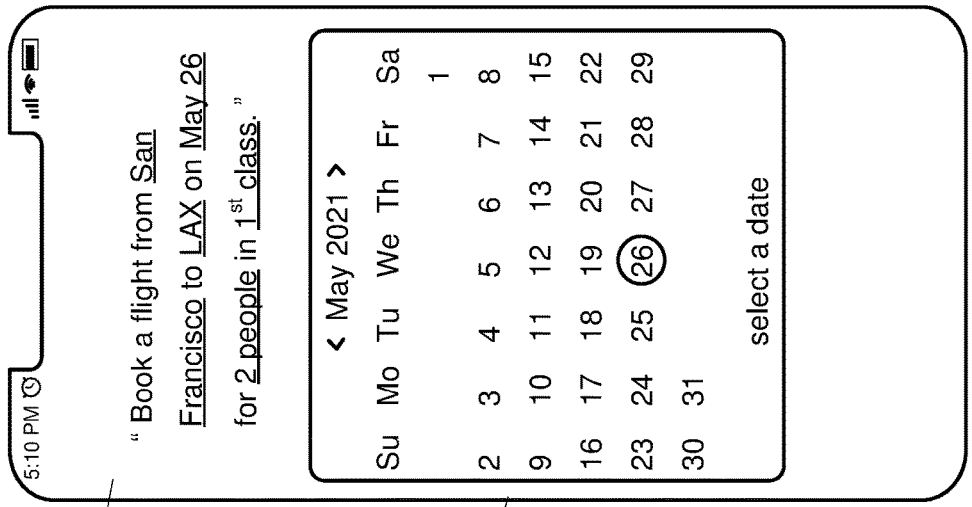
FIG. 7B illustrates a next example user interface for receiving user input and presenting options for the user based on a predicted user intent.
Figure 7A:
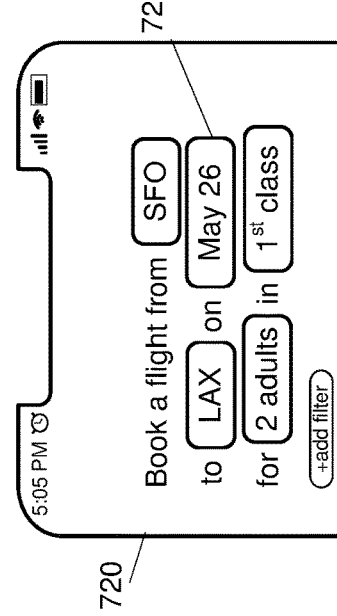
FIG. 7A illustrates another example user interface for receiving user input and presenting options for the user based on a predicted user intent.
Figure 7A:
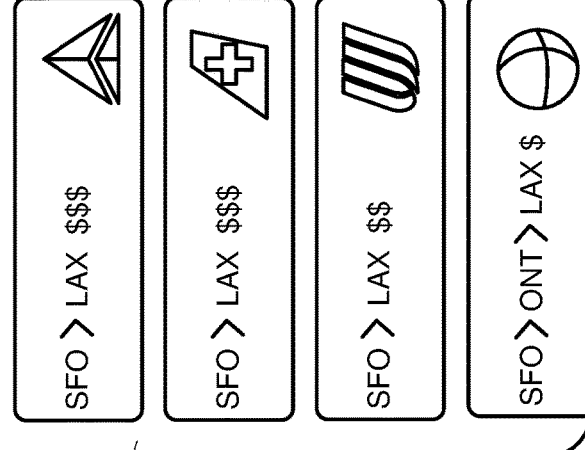
Figure 7C:
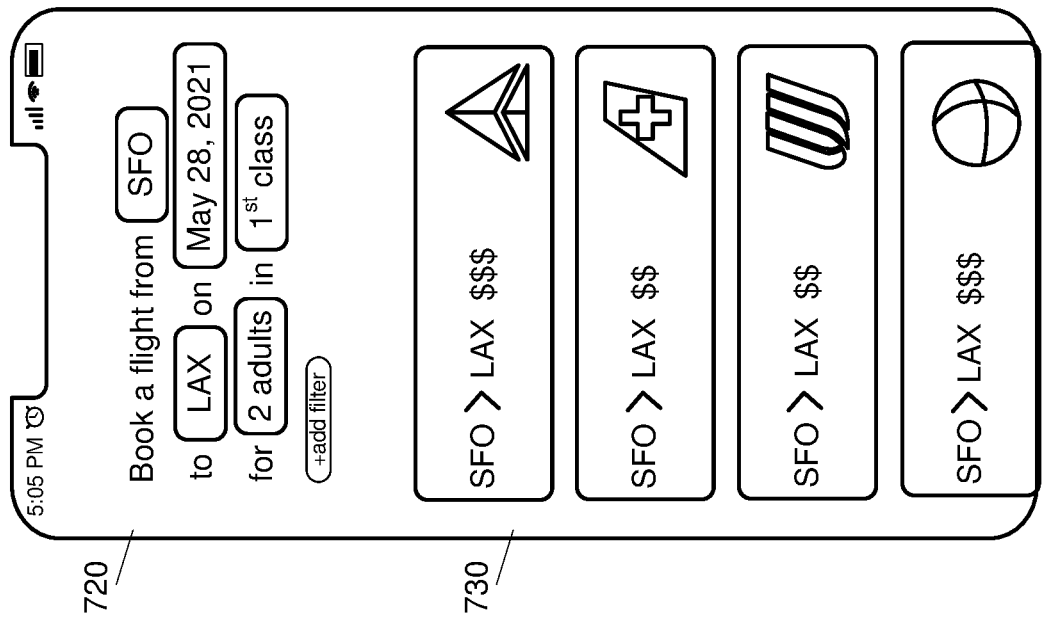
FIG. 7C illustrates a next example user interface for receiving user input and presenting options for the user based on a predicted user intent.

FIGS. 7A-7C illustrate another sequence of example user interfaces that may be presented to a user of a client device 110 as the user provides input. In the example of FIG. 7A, a user has provided a spoken input string 710 "Book a flight from San Francisco to LAX on May 26 for 2 people in 1$^{st}$ class". In the example of FIG. 7A, the input region of the interface includes a displayed version of an input string 710 that is analyzed. Entity values 720 detected in the input string 710 are displayed as editable entities (or actionable variables) that are presented as with a different visual characteristic 721, e.g., a button or underline or highlighted text or different font color. The interface region includes suggestion widgets 730 displaying flight options that a user can scroll through and select based on the predicted user intent and the detected entity values. The widgets may be associated with an application and may be enabled to display information from the application corresponding to the entity values.

FIG. 7B illustrates a next example user interface for receiving user input and presenting options for the user based on a predicted user intent. In FIG. 7B, the user has selected the button 721 indicating the travel date entity (e.g., "May 26") in the interface of FIG. 7A. The interface has morphed based on the user selection to include an editable (or selectable for change) input string 740 in the input region. The user interface also has morphed to include a different suggestion widget 731 that prompts the user to enter a date in response to the user's selection of the travel date entity button for editing. In some embodiments, as shown in FIG. 7B, the editable input string 740 may include formatting or annotations such as underlines or different font colors to indicate which words the morphing interface system 130 associated with different entities.

FIG. 7C illustrates a next example user interface for receiving user input and presenting options for the user based on a predicted user intent. In FIG. 7C, the user has selected an alternate travel date via the suggestion widget 731 of the interface in FIG. 7B. The input region of the interface has morphed back into a representation of an analyzed input string 720 with buttons representing the detected entity values, and the interface region has an updated list of suggestion widgets 730 representing possible flights for the user to select based on the predicted user intent and the associated entity values.

In various embodiments, the morphing interface system 130 may include additional functionalities that support an end-to-end user experience. Some implementations of the morphing interface system 130 may provide pre-generated common input options. For example, rather than having to type or speak an input, a user may have the option to select a sample input sentence that then populates follow up screens. Other functionalities may include the ability to access a friends list for collaboration or to continue a conversation. The morphing interface system 130 may also include options to save input sentences so that a user may be able to select an input again in the future without re-typing or otherwise re-inputting the values or may be able to compare options for different input sentences. Additionally, in some embodiments, the user may be able to shuffle through different suggestion widget interfaces for editing entity values associated with a predicted intent.

Figure 8:
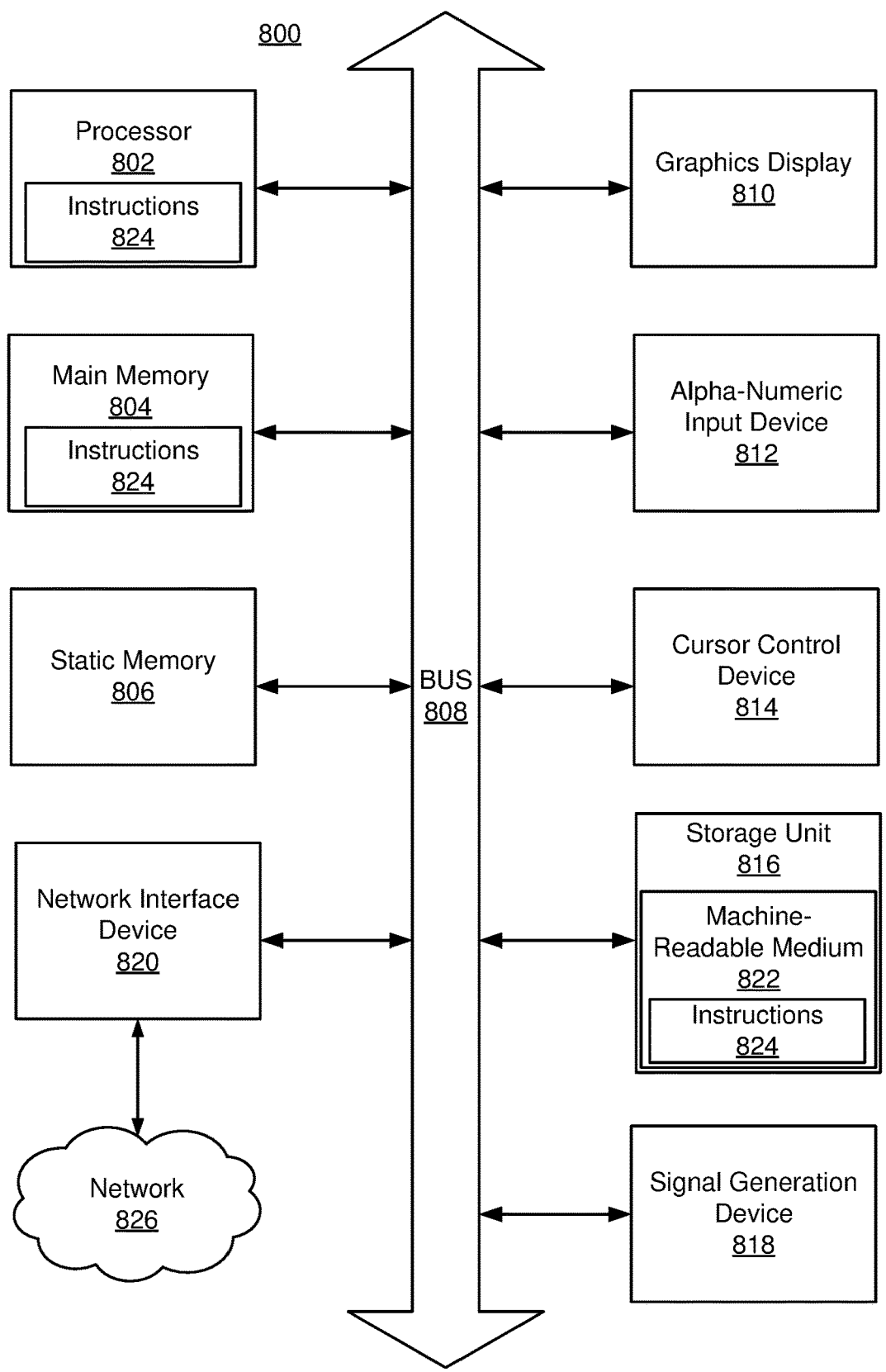
FIG. 8 is a block diagram illustrating components of an example machine able to read instructions from a machine-readable medium and execute them in one or more processors (or controllers), in accordance with an embodiment.

FIG. 8 is a block diagram illustrating components of an example machine able to read instructions from a machine-readable medium and execute them in one or more processors (or controllers). Specifically, FIG. 8 shows a diagrammatic representation of an example computer system 800 of which some or all of the components described herein may be used for operation of the morphing interface system 130. The computer system 800 can be used to execute instructions 824 (e.g., program code or software) for causing the machine to perform any one or more of the methodologies (or processes) described with respect to the functional descriptions in FIGS. 1-7C. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 806 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include instructions for implementing the functionalities of the context-aware query completion system 210, the intent completion module 214, the entity completion module 216, the natural language processing module 220, and the interpolation module 230. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826, such as the network 120, via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. For instance, a computing device coupled to a data storage device storing the computer program can correspond to a special-purpose computing device. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method comprising:
receiving a user input from a client device;
generating a set of intent suggestions based on the user input, each intent suggestion is associated with a set of intent parameters;
transmitting, to the client device, one or more intent suggestions in a form of a text string that is reflective of the user input, the text string comprising the one or more intent suggestions and being displayed on a screen of the client device;
causing the client device to identify, on the screen, one or more selectable intent suggestions in the text string, each selectable intent suggestion being marked by a visual characteristic in the text string to indicate that the selectable intent suggestion is selectable;
receiving, from the client device, a first user selection of a first visual characteristic associated with a first selectable intent suggestion;
responsive to receiving the first user selection, identifying a first set of intent parameters associated with the first selectable intent suggestion;
transmitting, to the client device, the first set of intent parameters for rendering on a first software user interface;
causing, responsive to receiving the first user selection of the first visual characteristic, the client device to transition to the first software user interface, the first software user interface comprising (1) the text string that comprises one or more visual characteristics associated with the one or more selectable intent suggestions and (2) a first region that is configured to allow selection of the first set of intent parameters, wherein the text string further comprises a second visual characteristic associated with a second selectable intent suggestion;
receiving, from the client device, a second user selection of the first set of intent parameters;
receiving, from the client device, a third user selection of the second visual characteristic associated with the second selectable intent suggestion;
responsive to receiving the third user selection, identifying a second set of intent parameters associated with the second selectable intent suggestion;
transmitting, to the client device, the second set of intent parameters for rendering on a second software user interface;
causing, responsive to receiving the third user selection of the second visual characteristic, the client device to transition to the second software user interface, the second software user interface comprising (1) the text string that comprises one or more visual characteristics associated with the one or more selectable intent suggestions and (2) a second region that is configured to allow selection of the second set of intent parameters, the second region having a different layout than the first region;
receiving, from the client device, a fourth user selection of the second set of intent parameters; and
executing a selected intent based on the selections of the first and second sets of intent parameters.

2. The computer-implemented method of claim 1, wherein the set of intent suggestions is generated based on at least one of: user profile data, contextual data, and global knowledge data.

3. The computer-implemented method of claim 1, wherein generating the set of intent suggestions includes:
predicting an intent template describing a generalized intent that is likely to be relevant to a user of the client device, wherein the generalized intent describes a category of possible intents; and
interpolating one or more specific intents based on the predicted intent template, wherein a specific intent is an intent that is associated with a set of executable functions.

4. The computer-implemented method of claim 1, wherein generating the set of intent suggestions comprises applying the user input to a ruleset that is configured to output a prediction of one or more intents that are likely to be associated with the user input.

5. The computer-implemented method of claim 1, wherein generating the set of intent suggestions comprises applying the user input to a machine learning model that includes one or more neural networks that are trained to produce a prediction of one or more intents that are likely to be associated with the user input.

6. The computer-implemented method of claim 1, wherein the text string comprises one or more words representing intent parameters.

7. A computer system comprising:
one or more computer processors for executing computer program instructions; and
a non-transitory computer-readable storage medium comprising stored instructions executable by at least one processor, the instructions, when executed, causing the processor to:
receive a user input from a client device;
generate a set of intent suggestions based on the user input, each intent suggestion is associated with a set of intent parameters;
transmit, to the client device, one or more intent suggestions in a form of a text string that is reflected of the user input, the text string comprising the one or more intent suggestions and being displayed on a screen of the client device;
cause the client device to identify, on the screen, one or more selectable intent suggestions in the text string, each selectable intent suggestion being marked by a visual characteristic in the text string to indicate that the selectable intent suggestion is selectable;
receive, from the client device, a first user selection of a first visual characteristic associated with a first selectable intent suggestion;
responsive to receiving the first user selection, identify a first set of intent parameters associated with the first selectable intent suggestion;
transmit, to the client device, the first set of intent parameters for rendering on a first software user interface
cause, responsive to receiving the first user selection of the first visual characteristic, the client device to transition to the first software user interface, the first software user interface comprising (1) the text string that comprises one or more visual characteristics associated with the one or more selectable intent suggestions and (2) a first region that is configured to allow selection of the first set of intent parameters, wherein the text string further comprises a second visual characteristic associated with a second selectable intent suggestion;
receive, from the client device, a second user selection of the first set of intent parameters;
receive, from the client device, a third user selection of the second visual characteristic associated with the second selectable intent suggestion;
responsive to receiving the third user selection, identify a second set of intent parameters associated with the second selectable intent suggestion;
transmit, to the client device, the second set of intent parameters for rendering on a second software user interface;
cause, responsive to receiving the third user selection of the second visual characteristic, the client device to transition to the second software user interface, the second software user interface comprising (1) the text string that comprises the one or more visual characteristics associated with the one or more selectable intent suggestions and (2) a second region that is configured to allow selection of the second set of intent parameters, the second region having a different layout than the first region;
receive, from the client device, a fourth user selection of the second set of intent parameters; and
execute a selected intent based on the selections of the first and second sets of intent parameters.

8. The computer system of claim 7, wherein the set of intent suggestions is generated based on at least one of: user profile data, contextual data, and global knowledge data.

9. The computer system of claim 7, wherein the instructions that cause the processor to generate the set of intent suggestions comprise instructions that, when executed, cause the processor to:
predict an intent template describing a generalized intent that is likely to be relevant to a user of the client device, wherein the generalized intent describes a category of possible intents; and
interpolate one or more specific intents based on the predicted intent template, wherein a specific intent is an intent that is associated with a set of executable functions.

10. The computer system of claim 7, wherein the instructions that cause the processor to generate the set of intent suggestions comprise instructions to apply the user input to a ruleset that is configured to output a prediction of one or more intents that are likely to be associated with the user input.

11. The computer system of claim 7, wherein the instructions that cause the processor to generate the set of intent suggestions comprise instructions to apply the user input to a machine learning model that includes one or more neural networks that are trained to produce a prediction of one or more intents that are likely to be associated with the user input.

12. The computer system of claim 7, wherein the text string comprises one or more words representing intent parameters.

13. A non-transitory computer-readable storage medium comprising stored instructions executable by at least one processor, the instructions, when executed, causing the processor to:
receive a user input from a client device;
generate a set of intent suggestions based on the user input, each intent suggestion is associated with a set of intent parameters;
transmit, to the client device, one or more intent suggestions in a form of a text string that is reflected of the user input, the text string comprising the one or more intent suggestions and being displayed on a screen of the client device;
cause the client device to identify, on the screen, one or more selectable intent suggestions in the text string, each selectable intent suggestion being marked by a visual characteristic in the text string to indicate that the selectable intent suggestion is selectable;
receive, from the client device, a first user selection of a first visual characteristic associated with a first selectable intent suggestion;
responsive to receiving the first user selection, identify a first set of intent parameters associated with the first selectable intent suggestion;
transmit, to the client device, the first set of intent parameters for rendering on a first software user interface;
cause, responsive to receiving the first user selection of the first visual characteristic, the client device to transition to the first software user interface, the first software user interface comprising (1) the text string that comprises one or more visual characteristics associated with the one or more selectable intent suggestions and (2) a first region that is configured to allow selection of the first set of intent parameters, wherein the text string further comprises a second visual characteristic associated with a second selectable intent suggestion;

receive, from the client device, a second user selection of the first set of intent parameters;

receive, from the client device, a third user selection of the second visual characteristic associated with the second selectable intent suggestion;

responsive to receiving the third user selection, identify a second set of intent parameters associated with the second selectable intent suggestion;

transmit, to the client device, the second set of intent parameters for rendering on a second software user interface;

cause, responsive to receiving the third user selection of the second visual characteristic, the client device to transition to the second software user interface, the second software user interface comprising (1) the text string that comprises one or more visual characteristics associated with the one or more selectable intent suggestions and (2) a second region that is configured to allow selection of the second set of intent parameters, the second region having a different layout than the first region;

receive, from the client device, a fourth user selection of the second set of intent parameters; and execute a selected intent based on the selections of the first and second sets of intent parameters.

14. The non-transitory computer-readable storage medium of claim 13, wherein the set of intent suggestions is generated based on at least one of: user profile data, contextual data, and global knowledge data.

15. The non-transitory computer-readable storage medium of claim 13, wherein the instructions that cause the processor to generate the set of intent suggestions comprise instructions that, when executed, cause the processor to:
predict an intent template describing a generalized intent that is likely to be relevant to a user of the client device, wherein the generalized intent describes a category of possible intents; and
interpolate one or more specific intents based on the predicted intent template, wherein a specific intent is an intent that is associated with a set of executable functions.

16. The non-transitory computer-readable storage medium of claim 13, wherein the instructions that cause the processor to generate a set of intent suggestions comprise instructions to apply the user input to a machine learning model that includes one or more neural networks that are trained to produce a prediction of one or more intents that are likely to be associated with the user input.

17. The non-transitory computer-readable storage medium of claim 13, wherein the text string comprises one or more words representing intent parameters.

* * * * *